US008502928B2

(12) United States Patent (10) Patent No.: US 8,502,928 B2
Hirai et al. (45) Date of Patent: Aug. 6, 2013

(54) TELEVISION RECEIVER AND ELECTRONIC DEVICE

(75) Inventors: Yuichi Hirai, Tokyo (JP); Takayuki Arisaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 13/362,423

(22) Filed: Jan. 31, 2012

(65) Prior Publication Data

US 2013/0057781 A1 Mar. 7, 2013

(30) Foreign Application Priority Data

Sep. 1, 2011 (JP) ................................. 2011-190748

(51) Int. Cl.
*H04N 5/64* (2006.01)

(52) U.S. Cl.
USPC ........... 348/836; 348/739; 348/787; 348/794; 455/347; 361/679.01; 361/679.02; 361/679.06; 361/679.07

(58) Field of Classification Search
USPC ......................................................... 348/836
See application file for complete search history.

(56) References Cited

U.S. PATENT DOCUMENTS

| | | | | | |
|---|---|---|---|---|---|
| 3,900,706 | A | * | 8/1975 | Lemelson | 348/100 |
| 3,928,785 | A | * | 12/1975 | Standaart | 313/411 |
| 7,167,358 | B2 | * | 1/2007 | Iwasaki et al. | 361/679.21 |
| 2007/0172056 | A1 | * | 7/2007 | Nakanishi et al. | 380/210 |
| 2010/0149080 | A1 | * | 6/2010 | Teranishi et al. | 345/87 |
| 2010/0296009 | A1 | * | 11/2010 | Shinki et al. | 348/790 |
| 2010/0321870 | A1 | * | 12/2010 | Hirai et al. | 361/679.01 |
| 2011/0080389 | A1 | * | 4/2011 | Ishikawa et al. | 345/207 |
| 2011/0128683 | A1 | * | 6/2011 | Hirao et al. | 361/679.01 |

FOREIGN PATENT DOCUMENTS

| | | |
|---|---|---|
| JP | 02-226785 A2 | 9/1990 |
| JP | 11-249759 A2 | 9/1999 |
| JP | 2003-87378 A2 | 3/2003 |
| JP | 2004-220440 A2 | 8/2004 |
| JP | 2006-235425 A2 | 9/2006 |
| JP | 2009-175230 A2 | 8/2009 |
| JP | 2011-008356 A2 | 1/2011 |
| JP | 2011-119299 A2 | 6/2011 |

OTHER PUBLICATIONS

Notification of Reason for Rejection for Japanese Patent Application 2011-190748 Mailed Apr. 13, 2012.

* cited by examiner

*Primary Examiner* — Andy Rao
*Assistant Examiner* — Shan Elahi
(74) *Attorney, Agent, or Firm* — Knobbe Martens Olson & Bear LLP

(57) ABSTRACT

In one embodiment, a television receiver includes a housing, and a supporting member accommodated in the housing, including a first supporting surface, a second supporting surface located on an opposite side of the first supporting surface, a first end portion, a second end portion located on an opposite side of the first end portion, a third end portion connecting the first and second end portions, and a fourth end portion located on an opposite side of the third end portion, and including a plurality of openings penetrating from the first supporting surface to the second supporting surface. In addition, the supporting member includes a beam provided between the openings, and the beam includes a first beam portion which is parallel to the first or third end portion, and a second beam portion which is not parallel to the first and third end portions.

8 Claims, 19 Drawing Sheets

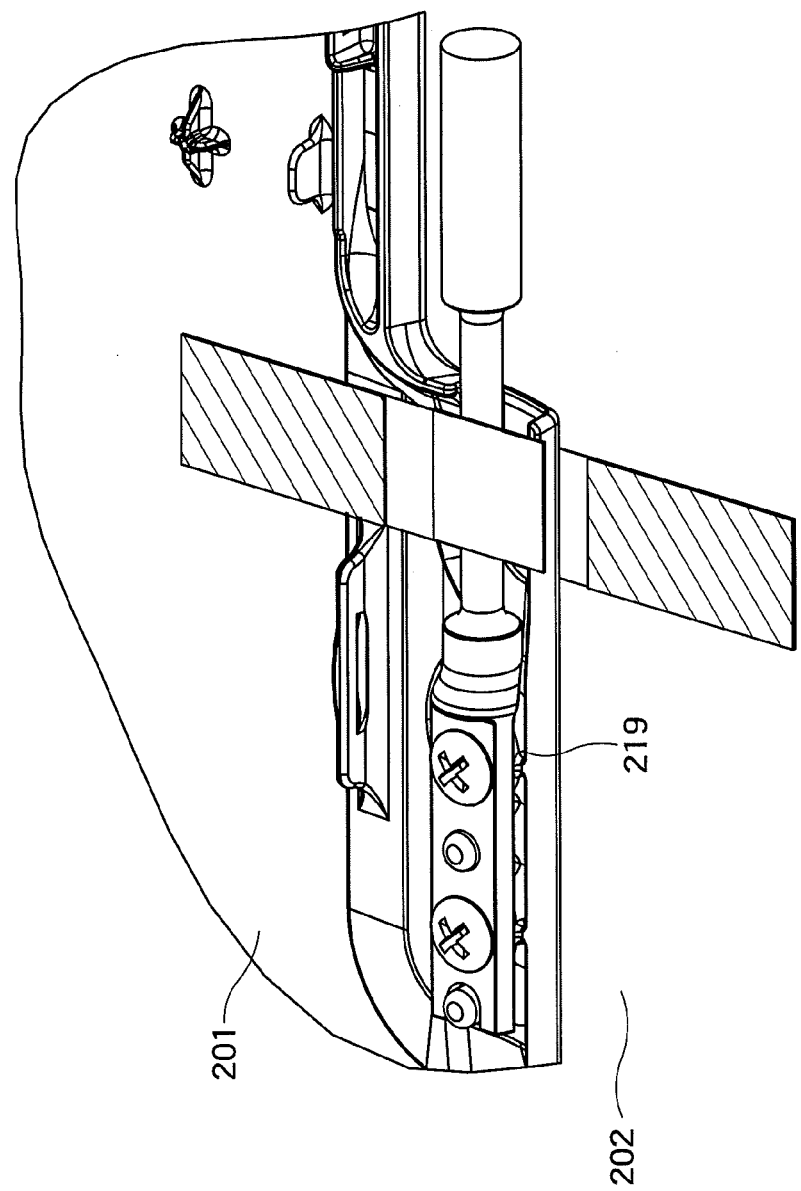

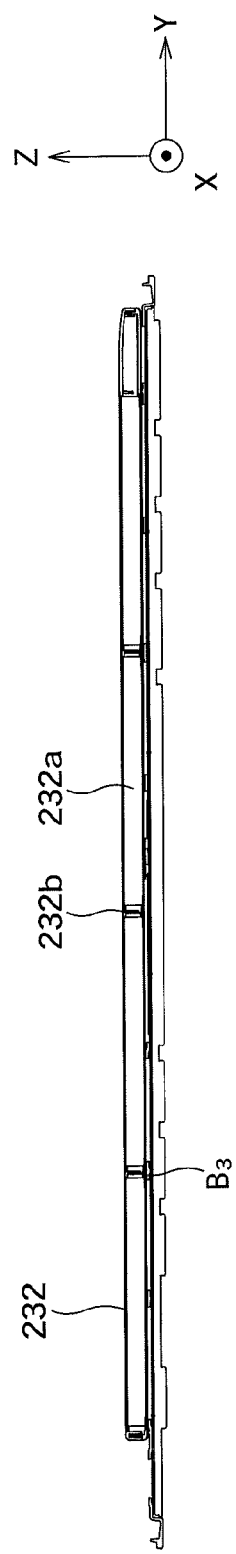
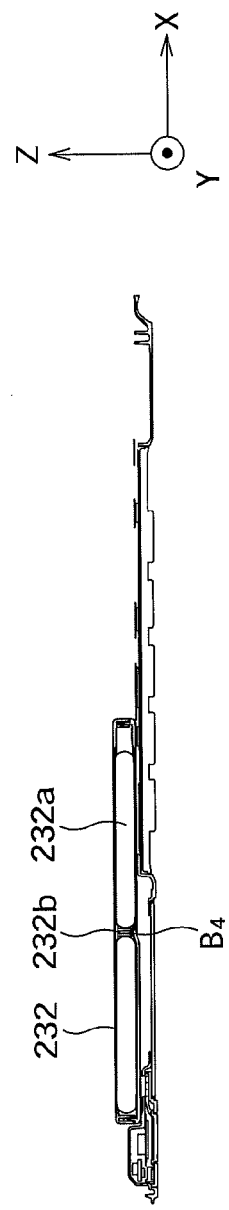
FIG. 15A
FIG. 15B

TELEVISION RECEIVER AND ELECTRONIC DEVICE

CROSS REFERENCE TO RELATED APPLICATION

This application is based upon and claims the benefit of priority from the prior Japanese Patent Application No. 2011-190748, filed on Sep. 1, 2011, the entire contents of which are incorporated herein by reference.

FIELD

Embodiments described herein relate to a television receiver and an electronic device.

BACKGROUND

Various electronic components in a television receiver are disposed on a supporting member which is called a middle frame. In a case where the middle frame having a beam structure is constructed by making plural holes in the middle frame for the purpose of weight reduction, there is a problem that rigidity of the middle frame is degraded.

BRIEF DESCRIPTION OF THE DRAWINGS

FIG. 8 is an enlarged perspective view of the connection unit of FIGS. 7A and 7B;
FIGS. 15A and 15B are sectional views illustrating a structure of the battery.

DETAILED DESCRIPTION

Embodiments will now be explained with reference to the accompanying drawings.

An embodiment described herein is a television receiver including a housing, and a supporting member accommodated in the housing, including a first supporting surface, a second supporting surface located on an opposite side of the first supporting surface, a first end portion, a second end portion located on an opposite side of the first end portion, a third end portion connecting the first and second end portions, and a fourth end portion located on an opposite side of the third end portion, and including a plurality of openings penetrating from the first supporting surface to the second supporting surface. The receiver further includes a first electronic component disposed on the first supporting surface of the supporting member, and a second electronic component disposed on the second supporting surface of the supporting member. In addition, the supporting member includes a beam provided between the openings, and the beam includes a first beam portion which is parallel to the first or third end portion, and a second beam portion which is not parallel to the first and third end portions.

Another embodiment described herein is an electronic device including a housing, and a supporting member accommodated in the housing, including a first supporting surface, and a second supporting surface located on an opposite side of the first supporting surface, and including a plurality of openings penetrating from the first supporting surface to the second supporting surface. In addition, the supporting member includes a beam provided between the openings, and the beam includes first and second beam portions which are neither parallel nor perpendicular to each other.

First Embodiment

Figure 1:
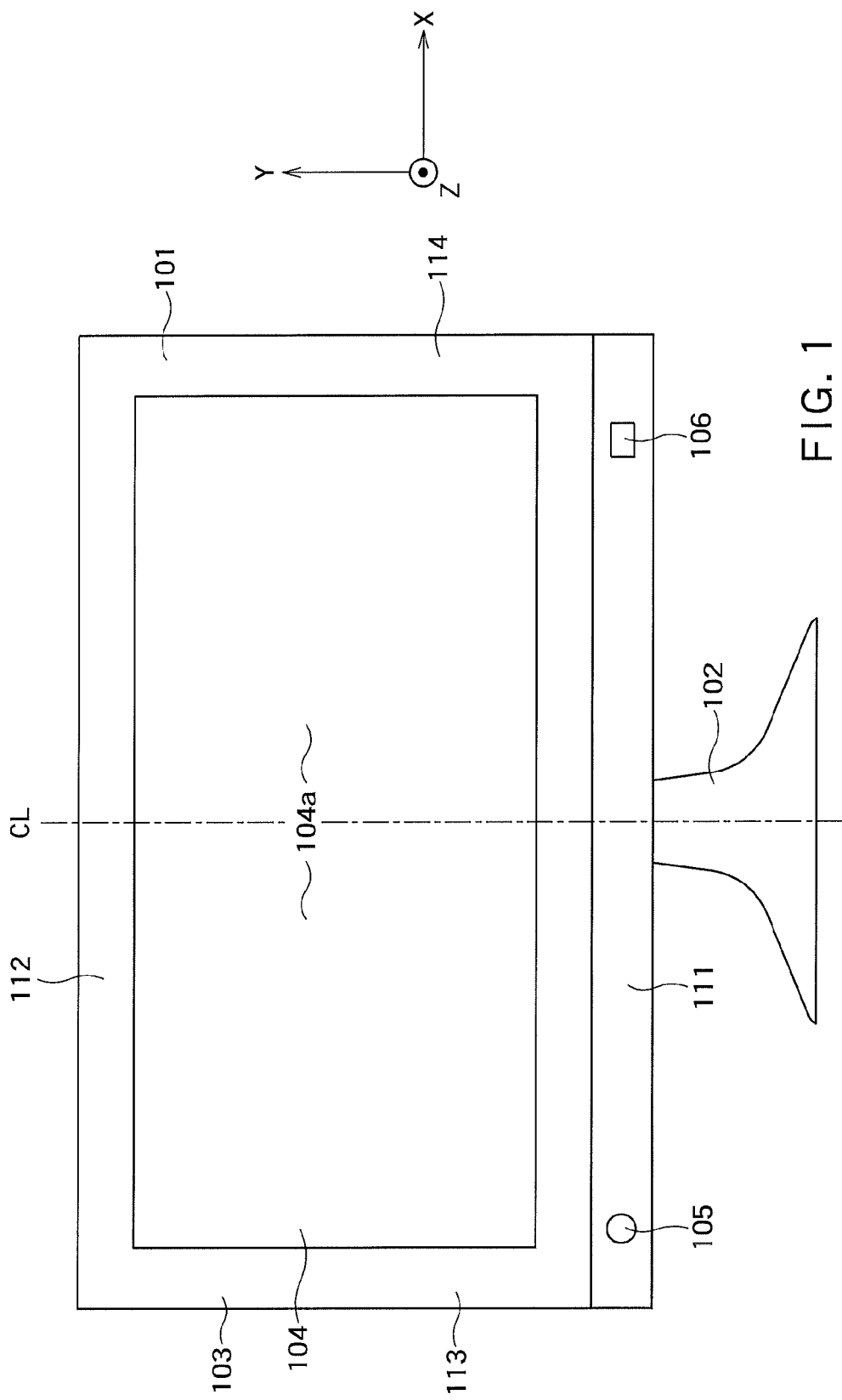
FIG. 1 is a front view illustrating an appearance of a television receiver of a first embodiment.

FIG. 1 is a front view illustrating an appearance of a television receiver of a first embodiment.

The television receiver of FIG. 1 includes a main body unit (display unit) 101 and a leg unit (a stand, a supporting unit, a support, and a mounting unit) 102. In the first embodiment, a top and a bottom are defined based on an attitude in which the leg unit 102 supports the main body unit 101. The right and the left are defined based on a point of sight of a user, and a position closer to the user is designed as a front position while a position farther away from the user is defined as a back position. In FIG. 1, a direction from the left toward the right, a direction from the bottom toward the top, and a direction from the back position toward the front position are indicated by an X-direction, a Y-direction, and a Z-direction, respectively.

The main body unit 101 includes a housing (a cover member, a combined member, a member, and a component) 103, a display device (a display module, a display unit, and an electronic component) 104 that is accommodated in the housing 103, a power button 105 that is provided in a front surface (a front face, on a display screen side) of the housing 103, and a remote controller sensor 106. The display device 104 includes a display screen 104a that is exposed to the front surface of the housing 103. An ON/OFF operation of the display screen 104a can be performed by pressing the power button 105, or by pressing a power button of a remote controller while a front portion of the remote controller is oriented toward a direction of the remote controller sensor 106.

The housing 103 includes first to fourth end portions (a side, a periphery, an edge portion, a side portion, a wall, and a surface) 111 to 114. The first end portion 111 is an end portion (a bottom surface, a bottom wall, a supporting surface, a supporting unit, and a peripheral wall) to which the leg unit 102 is attached. The second end portion (a top panel, an upper wall, a wall, a surface, and a peripheral wall) 112 is located on the opposite side of the first end portion 111, and extends in substantially parallel to the first end portion 111. The third end portion (a side portion, a side surface, a sidewall, and a peripheral wall) 113 connects the first end portion 111 and the second end portion 112, and extends in a direction substantially perpendicular to the first end portion 111. The fourth end portion (a side portion, a side surface, a sidewall, and a peripheral wall) 114 is located on the opposite side of the third end portion 113, and extends in substantially parallel to the third end portion 113. Similarly to the third end portion 113, the fourth end portion 114 connects the first end portion 111 and the second end portion 112.

The first and second end portions 111 and 112 extend in a lengthwise direction of the housing 103. On the other hand, the third and fourth end portions 113 and 114 extend in a crosswise direction of the housing 103, and are shorter than the first and second end portions 111 and 112.

If the leg unit 102 supports the main body unit 101, the first to fourth end portions 111 to 114 configure a lower end portion, an upper end portion, a left end portion, and a right end portion of the housing 103, respectively. In FIG. 1, the first and second end portions 111 and 112 are substantially parallel to an X-direction, and the third and fourth end portions 113 and 114 are substantially parallel to a Y-direction. A straight line CL of FIG. 1 indicates a center line of the first end portion 111 and the second end portion 112.

In the first embodiment, the housing 103 includes the four end portions 111 to 114. Alternatively, the housing 103 may include three end portions or less or at least five end portions. The first end portion 111 and the second end portion 112 may extend while being not parallel to each other. Similarly the third end portion 113 and the fourth end portion 114 may extend while being not parallel to each other.

Figure 2:
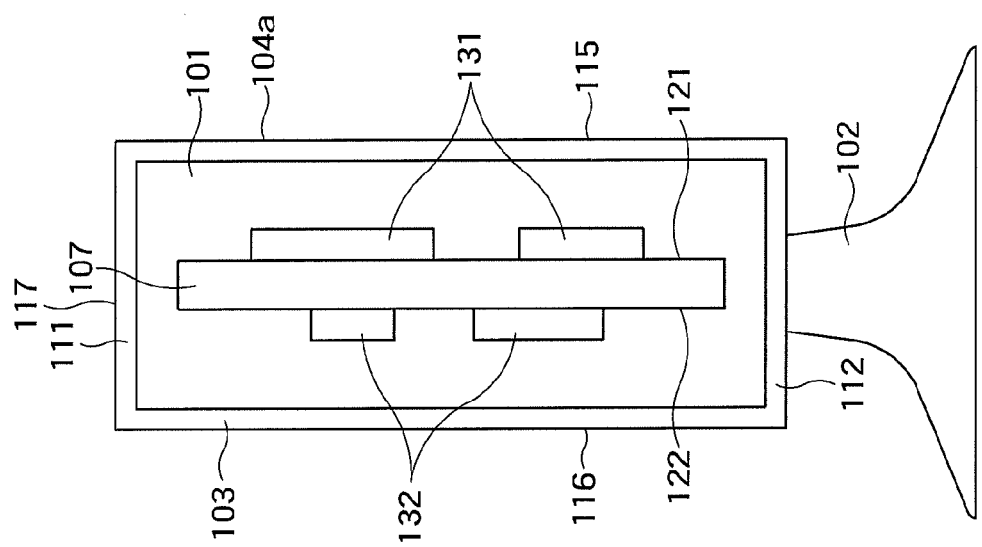
FIG. 2 is a sectional view illustrating a structure of the television receiver of the first embodiment.

FIG. 2 is a sectional view illustrating a structure of the television receiver of the first embodiment.

As illustrated in FIG. 2, the housing 103 includes a front surface (a first surface, a first wall, a wall, and a mask) 115, a back surface (a second surface, a second wall, a wall, and a cover) 116, and a peripheral surface (a third surface, a third wall, a wall, part of the mask or part of the cover, and a portion covering the mask and the cover) 117. The front surface 115 is a surface to which the display screen 104a is exposed. The back surface 116 is located on the opposite side of the front surface 115. The peripheral surface 117 connects the edge portion of the front surface 115 and the edge portion of the back surface 116.

In the first embodiment, the housing 103 has a planar structure including the front surface 115, the back surface 116, and the peripheral surface 117. Alternatively, the housing 103 may have a planar structure except that of the first embodiment.

As illustrated in FIG. 2, the main body unit 101 also includes a middle frame (a housing, a supporting unit, a supporting surface, a supporting wall, a component placing unit, a frame, an intermediate member, a bone member, a plate, and a reinforcement unit) 107 that is accommodated in the housing 103. The middle frame 107 is a supporting member that supports various components.

The middle frame 107 includes a first supporting surface (first surface) 121 and a second supporting surface (second surface) 122. The first supporting surface 121 is oriented toward the side of the front surface 115. The second supporting surface 122 is oriented toward the side of the back surface 116, and located on the opposite side of the first supporting surface 121.

The main body unit 101 includes a first electronic component 131 that is disposed on the first supporting surface 121 of the middle frame 107 and a second electronic component 132 that is disposed on the second supporting surface 122 of the middle frame 107. A circuit board on which a semiconductor element and a circuit element are mounted can be cited as an example of the electronic components 131 and 132. A component except the electronic components 131 and 132 may be disposed on the surface, domain, portion, and supporting unit of the middle frame 107, such as the supporting surfaces 121 and 122 of the middle frame 107.

Figure 3:
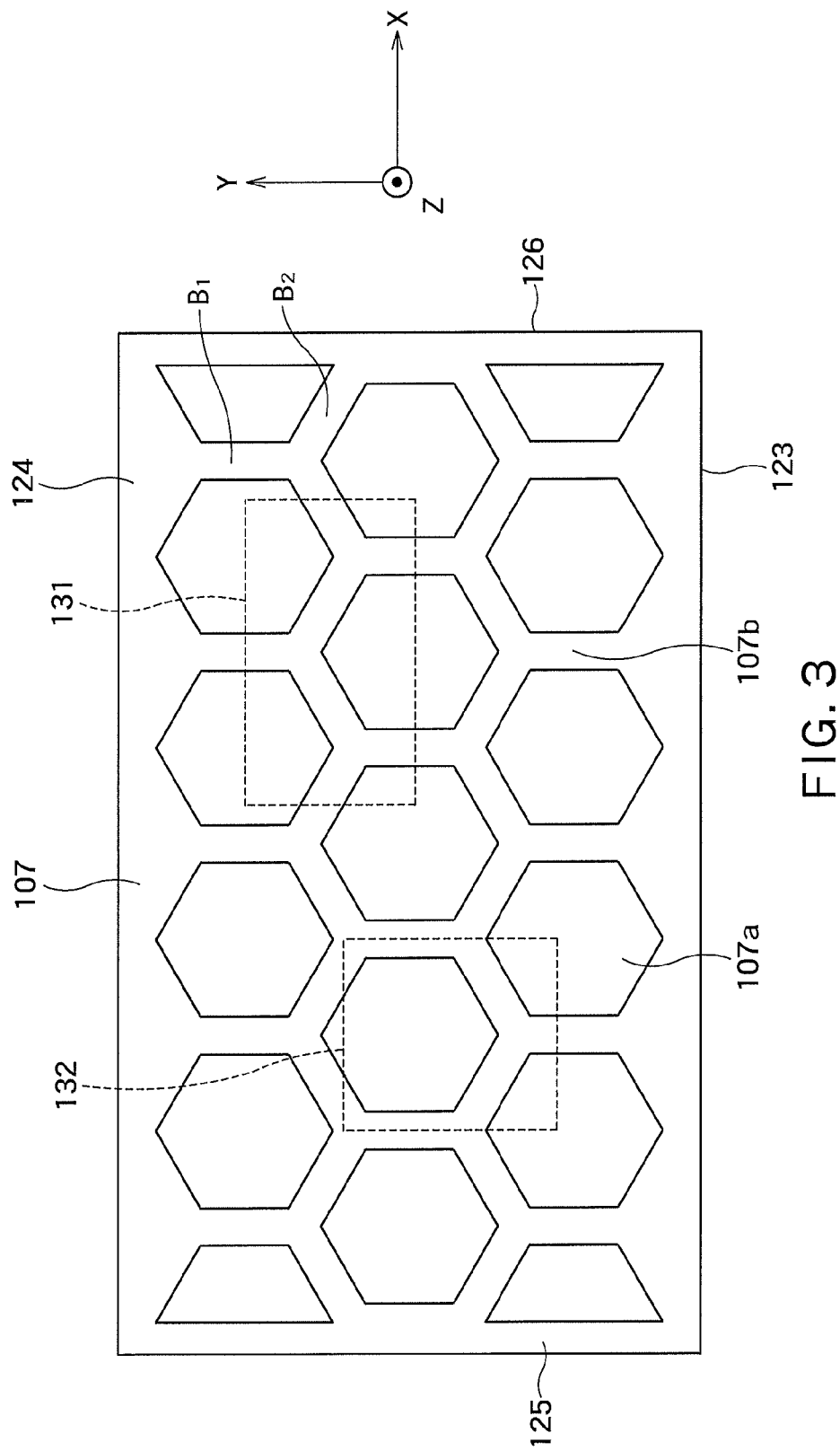
FIG. 3 is a front view illustrating a shape of a middle frame.

FIG. 3 is a front view illustrating a shape of the middle frame 107.

As illustrated in FIG. 3, the middle frame 107 includes first to fourth end portions (a side, a periphery, an edge portion, a side portion, a wall, and a surface) 123 to 126. The first end portion (a bottom surface, a bottom wall, a supporting surface, a supporting unit, and a peripheral wall) 123 is located on the side of the leg unit 102. The second end portion (a top panel, an upper wall, a wall, a surface, and a peripheral wall) 124 is located on the opposite side of the first end portion 123, and extends in substantially parallel to the first end portion 123. The third end portion (a side portion, a side surface, a sidewall, and a peripheral wall) 125 connects the first end portion 123 and the second end portion 124, and extends in a direction substantially perpendicular to the first end portion 123. The fourth end portion 126 is located on the opposite side of the third end portion 125, and extends in substantially parallel to the third end portion 125. Similarly to the third end portion 125, the fourth end portion (a side portion, a side surface, a sidewall, and a peripheral wall) 126 connects the first end portion 123 and the second end portion 124.

The first and second end portions 123 and 224 extend in the lengthwise direction of the middle frame 107. On the other hand, the third and fourth end portions 125 and 126 extend in the crosswise direction of the middle frame 107, and are shorter than the first and second end portions 123 and 124.

If the leg unit 102 supports the main body unit 101, the first to fourth end portions 123 to 126 configure the lower end portion, the upper end portion, the left end portion, and the right end portion of the middle frame 107, respectively. In FIG. 3, the first and second end portions 123 and 124 are substantially parallel to the X-direction, and the third and fourth end portions 125 and 126 are substantially parallel to the Y-direction.

In this embodiment, the middle frame 107 includes the four end portions 123 to 126. Alternatively, the middle frame 107 may include the three end portions or less or at least five end portions. The first end portion 123 and the second end portion 124 may extend while being not parallel to each other. Similarly the third end portion 125 and the fourth end portion 126 may extend while being not parallel to each other.

As illustrated in FIG. 3, the middle frame 107 includes plural openings 107a that penetrate from the first supporting surface 121 to the second supporting surface 122 and a beam (a wall, a support surface, a supporting plate, a supporting domain, an intermediate unit, a pillar unit, a bridge unit, and a reinforcement unit) 107b that is provided between the openings 107a. A weight of the middle frame 107 is reduced by making such openings 107a.

The middle frame 107 includes an opening having a hexagonal shape as the opening 107a. As a result, the middle frame 107 has a honeycomb beam structure. In FIG. 3, the beam 107b of the middle frame 107 includes a first beam portion (a portion, a domain, an extending portion, and a covering portion) $B_1$ that is parallel to the third end portion 125 (that is, parallel to the Y-direction) and a second beam portion (a portion, a domain, an extending portion, and a covering portion) $B_2$ that is not parallel to the first and third end portions 123 and 125 (that is, not parallel to the X-direction and the Y-direction). The beam portions $B_1$ and $B_2$ configure the honeycomb beam structure.

As described above, the middle frame 107 of this embodiment has the honeycomb beam structure including the first beam portion $B_1$ that is parallel to the Y-direction and the second beam portion $B_2$ that is not parallel to the X-direction or the Y-direction. The honeycomb beam structure has the following advantages compared with a square type beam structure including the first beam portion $B_1$ that is parallel to the Y-direction and the second beam portion $B_2$ that is parallel to the X-direction.

First, in the middle frame 107 having the honeycomb beam structure, torsional rigidity and bending rigidity are increased compared with the same-weight middle frame 107 having the square type beam structure.

Second, in the middle frame 107 having the honeycomb beam structure, the rigidity against a pressure from the sides of the first and second end portions 123 and 124 or a pressure from the sides of the third and fourth end portions 125 and 126 is higher compared with the same-weight middle frame 107 having the square type beam structure.

Third, the weight of the middle frame 107 having the honeycomb beam structure can be reduced similarly to the middle frame 107 having the square type beam structure.

According to this embodiment, the use of the beam structure can enhance the rigidity of the middle frame 107 while reducing the weight of the middle frame 107. As a result, the weight reduction and the improvement of the rigidity can be achieved in the television receiver.

Recently, enlargement and thinning of the television receiver have advanced rapidly. Generally, the enlarged television receiver increases the weight of the television receiver, and the thin television receiver decreases the rigidity of the television receiver. According to this embodiment, the use of the middle frame 107 having the honeycomb beam structure can deal with the problems associated with the enlargement and the thinning of the television receiver.

The middle frame 107 may have a beam structure except the above beam structure. For example, the middle frame 107 may have a beam structure including the first and second beam portions $B_1$ and $B_2$ that are neither parallel to each other nor perpendicular to each other. Examples of such a beam structure include a honeycomb beam structure including the first beam portion $B_1$ that is parallel to the X-direction and the second beam portion $B_2$ that is not parallel to the X-direction or the Y-direction.

The weight reduction and the improvement of the rigidity can be achieved by providing a supporting unit, a reinforcement unit, a projection, a protrusion unit, and a thick-wall unit, each of which includes a first portion $B_1$ that is parallel to the Y-direction and a second portion $B_2$ that is not parallel to the X-direction or the Y-direction similarly to the beam 107b, in the middle frame 107. The supporting unit supports the component, and the reinforcement unit reinforces the middle frame 107. The projection has a projected shape with respect to the opening 107a, and the protrusion unit protrudes in the opening 107a. The thick-wall unit is a thick-wall portion in the middle frame 107.

As described above, the middle frame 107 of this embodiment has the beam structure including the first beam portion $B_1$ that is parallel to the first or third end portion 123 or 125 and the second beam portion $B_2$ that is not parallel to the first or third end portions 123 or 125. Therefore, according to this embodiment, the use of the beam structure can enhance the rigidity of the middle frame 107 while reducing the weight of the middle frame 107.

This embodiment can also be applied to electronic devices, except the television receiver, for example, a notebook PC (Personal Computer). An example of the notebook PC will be described in a second embodiment.

Second Embodiment

Figure 4:
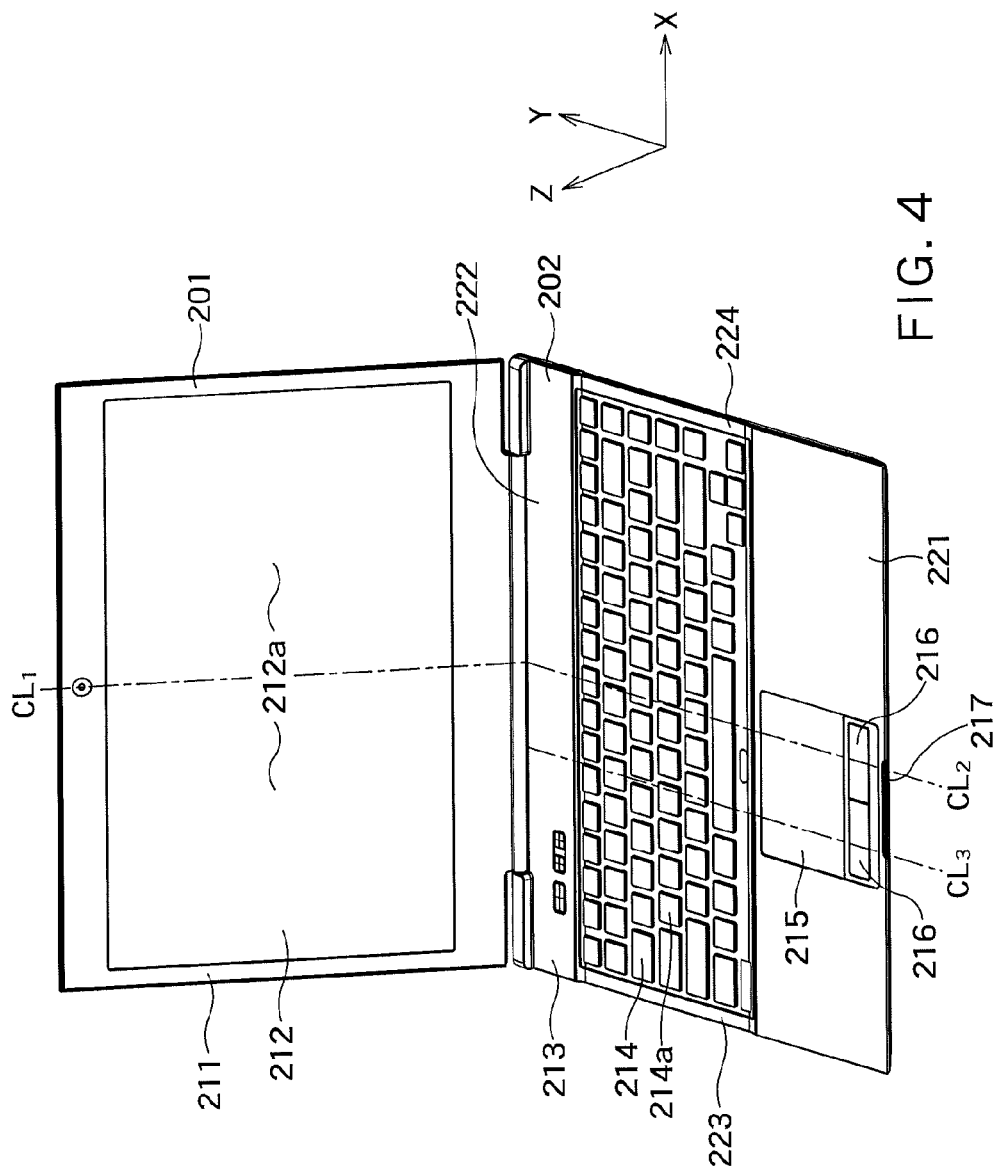
FIG. 4 is a perspective view illustrating an appearance of a notebook PC of a second embodiment.

FIG. 4 is a perspective view illustrating an appearance of the notebook PC of the second embodiment. The notebook PC of FIG. 4 may be a PC that acts as the television receiver or a PC that does not act as the television receiver.

The PC of FIG. 4 includes a first main body unit (first portion, first component accommodation unit) 201 and a second main body unit (second portion, second component accommodation unit) 202.

The first main body unit 201 includes a first housing (a cover member, a member, an assembly component, a component, a supporting unit, and a reinforcement unit) 211 and a display device (a display module, a display unit, an electronic component, and a component) 212 that is accommodated in the first housing 211. The display device 212 includes a display screen 212a that is exposed to a front surface of the first housing 211. A straight line $CL_1$ of FIG. 4 indicates a center line of the first housing 211.

The second main body unit 202 includes a second housing (a cover member, a member, an assembly component, a component, a supporting unit, and a reinforcement unit) 213, a keyboard (an input unit, an input receiving unit, a receiving unit, an operation unit, an operation domain, an interface unit, an input module, a unit, and a component) 214 that is accommodated in the second housing 213, a pointing device (an input unit, an input receiving unit, a receiving unit, an operation unit, an operation domain, an interface unit, an input module, a unit, a component, a surface, and a domain in which a touch sensor functions) 215 that is provided in the front surface of the second housing 213, a clickpad (an input unit, an input receiving unit, a receiving unit, an operation unit, an operation domain, an interface unit, an input module, a unit, a component, a surface, and a domain in which a touch sensor functions) 216, and a finger putting-on unit (an opening, a step unit, a recess, a hanging unit, and a projection) 217. The keyboard 214 includes plural keys 214a that are exposed to the front surface of the second housing 213. A straight line $CL_2$ of FIG. 4 indicates a center line of the second housing 213. A straight line $CL_3$ indicates a boundary line between a home position of a right hand of the keyboard 214 and a home position of a left hand.

In this embodiment, the right and left, the top and the bottom, and the front position and back position of the second main body unit 202 are defined based on a state in which the first main body unit 201 is opened from the side closer to the user toward the side farther away from the user while the second main body unit 202 is placed on a horizontal surface. In this embodiment, a direction parallel to the straight line connecting a left eye and a right eye of the user in the direction parallel to the horizontal surface is defined as the "right and left", and a direction perpendicular to the straight line is defines as the "top and bottom". A direction perpendicular to the horizontal surface is defines as the "front position and back position", and the position closer to the user is defined as the front position while the position farther away from the user is defined as the back position. In FIG. 1, the direction from the left toward the right, the direction from the bottom toward the top, and the direction from the back position toward the front position are indicated by the X-direction, the Y-direction, and the Z-direction, respectively.

The second housing 213 includes first to fourth end portions (a side, a periphery, an edge portion, a side portion, a wall, and a surface) 221 to 224. The finger putting-on unit 217 is provided in the first end portion (an end portion on the opposite side of a hinge, an end portion in the lengthwise direction, a side, a periphery, an edge portion, a side portion, a wall, and a surface) 221. A connection unit of the first housing 211 and the second housing 213 is provided in the second end portion (an end portion on the hinge side, a side, a periphery, an edge portion, a side portion, a wall, and a surface) 222. The second end portion 222 is located on the opposite side of the first end portion 221 and extends substantially-parallel/parallel to the first end portion 221. The third end portion (an end portion in the crosswise direction, a side, a periphery, an edge portion, a side portion, a wall, and a surface) 223 connects the first end portion 221 and the second end portion 222, and extends in the direction substantially perpendicular to the first end portion 221. The fourth end portion (an end portion in the crosswise direction, a side, a periphery, an edge portion, a side portion, a wall, and a surface) 224 is located on the opposite side of the third end portion 223, and extends in the direction substantially parallel to the third end portion 223. Similarly to the third end portion 223, the fourth end portion 224 connects the first end portion 221 and the second end portion 222.

The first and second end portions 221 and 222 extend in the lengthwise direction of the second housing 213. On the other hand, the third and fourth end portions 223 and 224 extend in the crosswise direction of the second housing 213, and are shorter than the first and second end portions 221 and 222.

If the first main body unit 201 is opened from the side closer to the user toward the side farther away from the user while the second main body unit 202 is placed on the horizontal surface, the first to fourth end portions 221 to 224 configure the lower end portion, the upper end portion, the left end portion, and the right end portion of the second housing 213, respectively. In FIG. 4, the first and second end portions 221 and 222 are substantially parallel to the X-direction, and the third and fourth end portions 223 and 224 are substantially parallel to the Y-direction. The straight line $CL_2$ of FIG. 4 indicates the center line of the first end portion 221 and the second end portion 222.

In this embodiment, the second housing 213 includes the four end portions 221 to 224. Alternatively, the second housing 213 may include the three end portions or less or at least the five end portions. The first end portion 221 and the second end portion 222 may extend while being not parallel to each other. Similarly the third end portion 223 and the fourth end portion 224 may extend while being not parallel to each other.

In this embodiment, the boundary line $CL_3$ of the home position is located closer to the side of the third end portion 223 than the center line $CL_2$. Therefore, the pointing device 215 is disposed such that a gravity center of the pointing device 215 is located closer to the side of the third end portion 223 than the center line $CL_2$. The boundary line of the right and left clickpads 216 is located closer to the side of the third end portion 223 than the center line $CL_2$. The finger putting-on unit 217 is placed such that a center point of the right end and the left end of the finger putting-on unit 217 is located closer to the side of the third end portion 223 than the center line $CL_2$. The finger putting-on unit 217 is a recess on which the user puts the user's finger when the user uses the keyboard 214.

FIGS. 5A to 5F are six hexagonal views illustrating an appearance of the notebook PC of the second embodiment.

Figure 5:
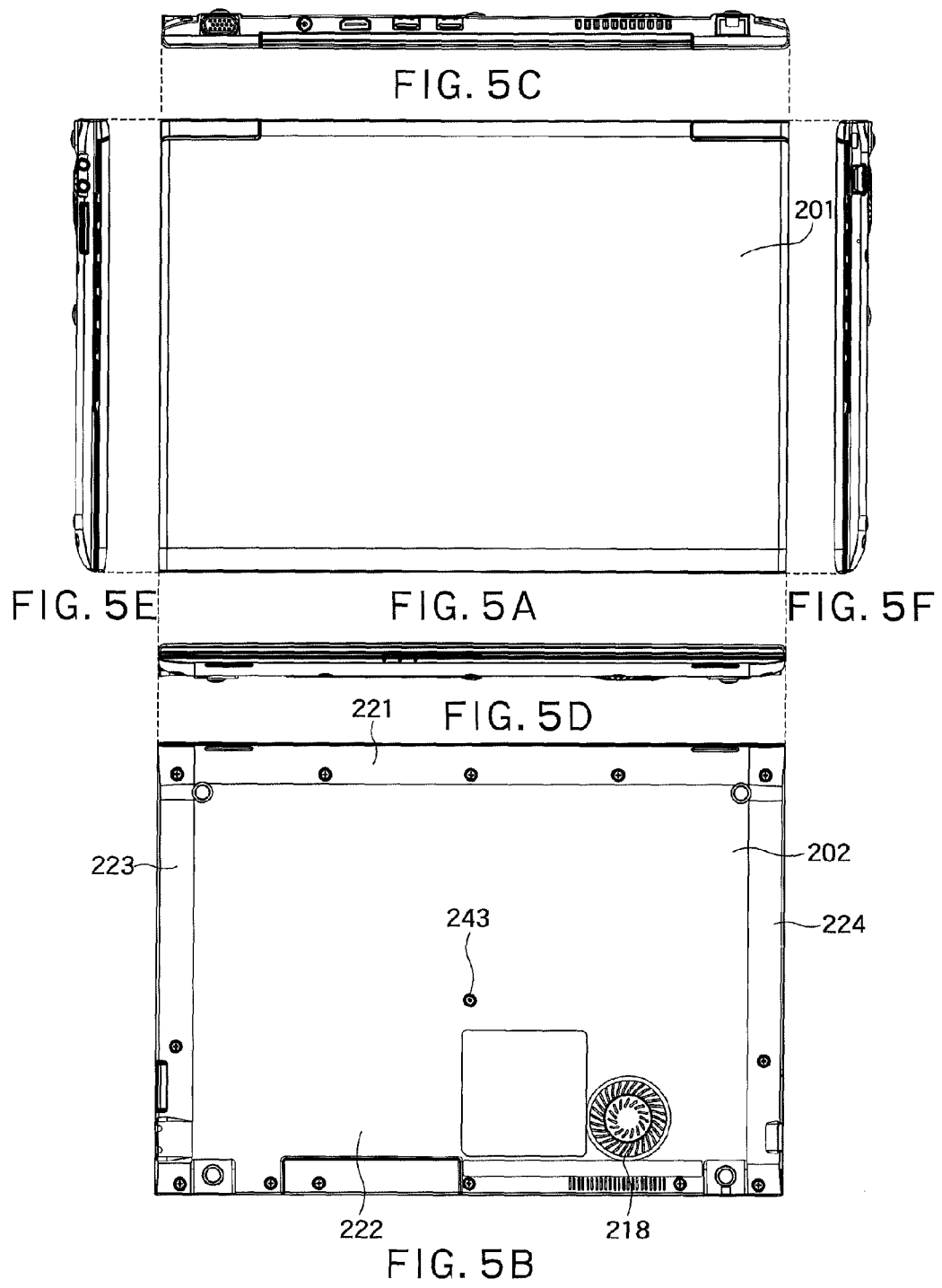
FIGS. 5A to 5F are six hexagonal views illustrating an appearance of the notebook PC of the second embodiment.

FIG. 5A is a front view of the PC of the embodiment. FIG. 5A illustrates the back surface of the first main body unit 201.

FIG. 5B is a rear view of the PC of the embodiment. FIG. 5B illustrates the back surface of the second main body unit 202. FIGS. 5C, 5D, 5E, and 5F are a top plan view, a bottom view, a left side view, a right side view of the PC of the embodiment, respectively.

As illustrated in FIG. 5B, a fan 218 is accommodated in the second housing 213. The fan 218 is disposed in the second end portion 222, and a vent hole of the fan 218 is provided in the back surface of the second housing 213.

Figure 6:
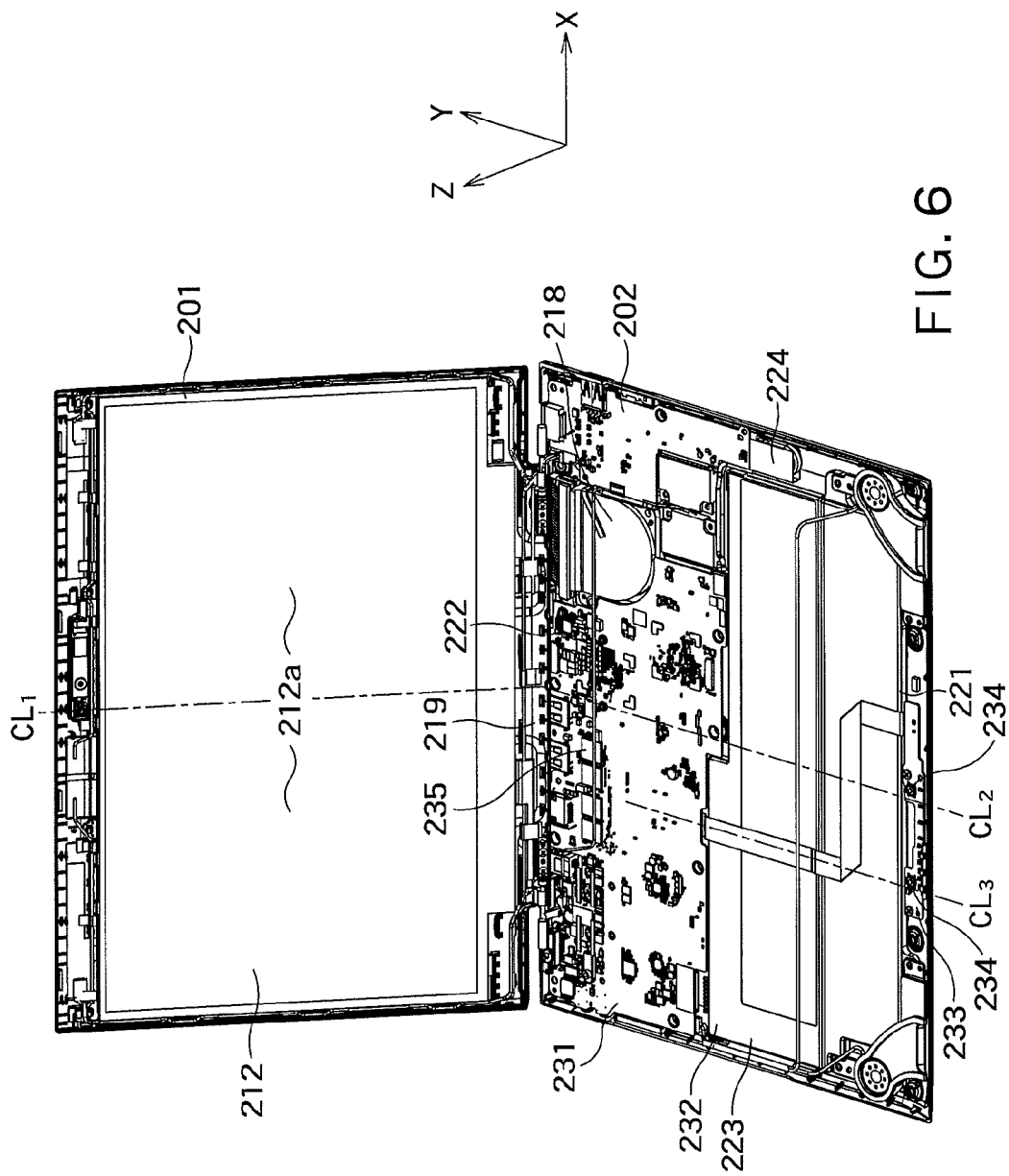
FIG. 6 is a perspective view illustrating an inner structure of the notebook PC of the second embodiment.

FIG. 6 is a perspective view illustrating an inner structure of the notebook PC of the second embodiment.

As illustrated in FIG. 6, a main circuit board (a printed circuit board, a circuit board, a board, an electronic component, a component, and a module) 231, a battery (a battery, a power supply unit, a unit, a charging unit, a component, and a module) 232, and a circuit board 233 for a click button 234 are accommodated in the second housing 213.

A semiconductor element such as a CPU (Central Processing Unit) 235 and a circuit element are mounted on the main circuit board 231. The main circuit board 231 is disposed in the second end portion 222. Because the fan 218 is used to cool the semiconductor element such as the CPU 235 and the circuit element, both the fan 218 and the main circuit board 231 are disposed in the second end portion 222.

The battery 232 is disposed in the first end portion 221 while the circuit board 233 for the click button 234 is interposed therebetween. In this embodiment, because the main circuit board 231 is disposed in a space on the side of the second end portion 222, the battery 232 is disposed in a remaining space on the side of the first end portion 221.

The click button 234 is mounted on the circuit board 233. The circuit board 233 is disposed in the first end portion 221. Specifically, the circuit board 233 is disposed in a position in which the clickpad 216 and the click button 234 overlap with each other when viewed from the Z-direction.

Figure 7A:
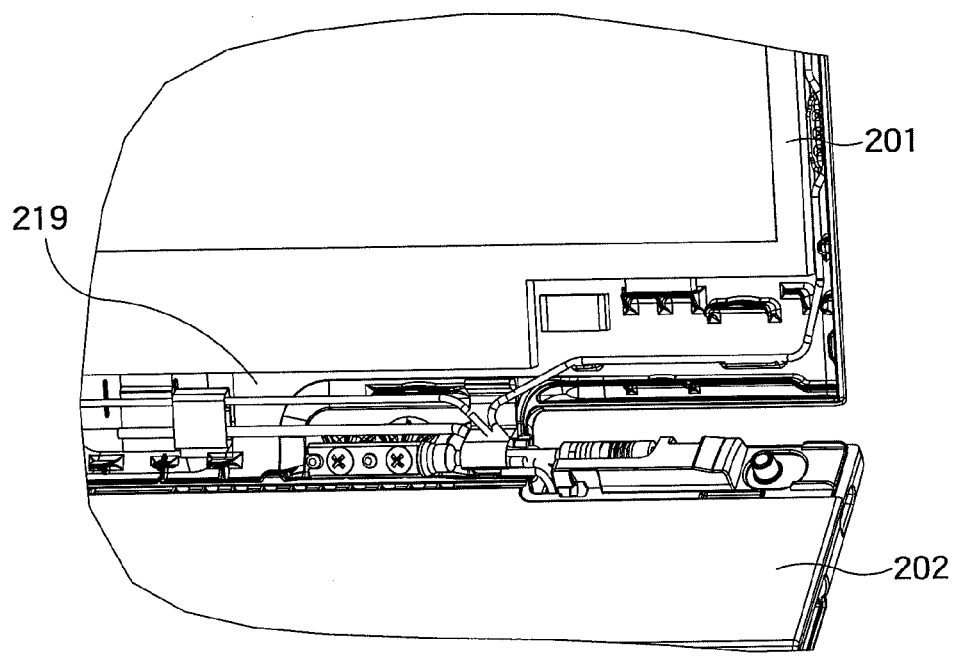
FIGS. 7A and 7B are perspective views illustrating a structure of a connection unit of first and second main body units.
Figure 7B:
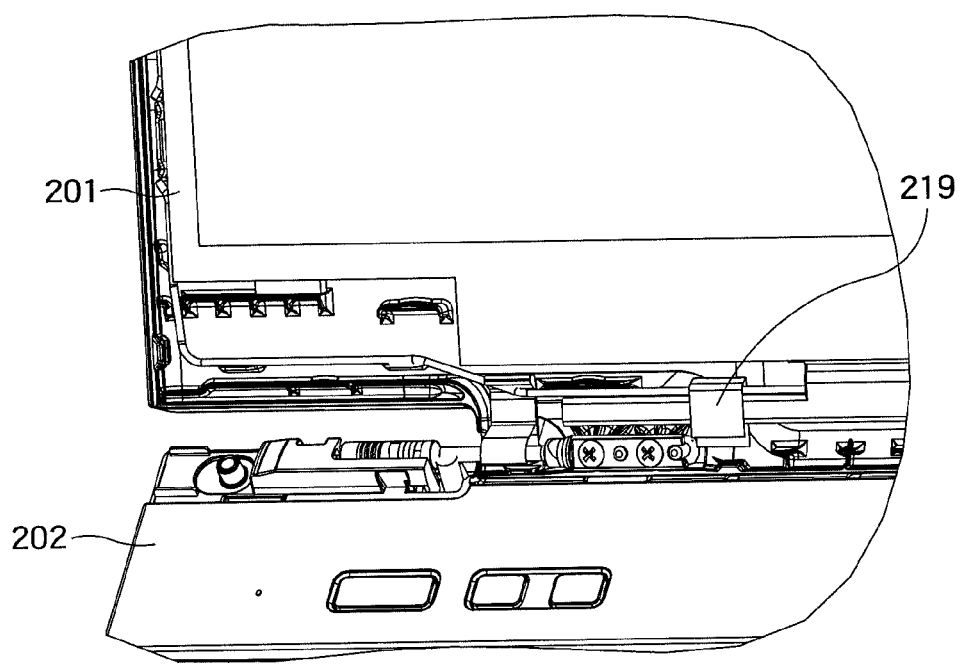
Figure 9:
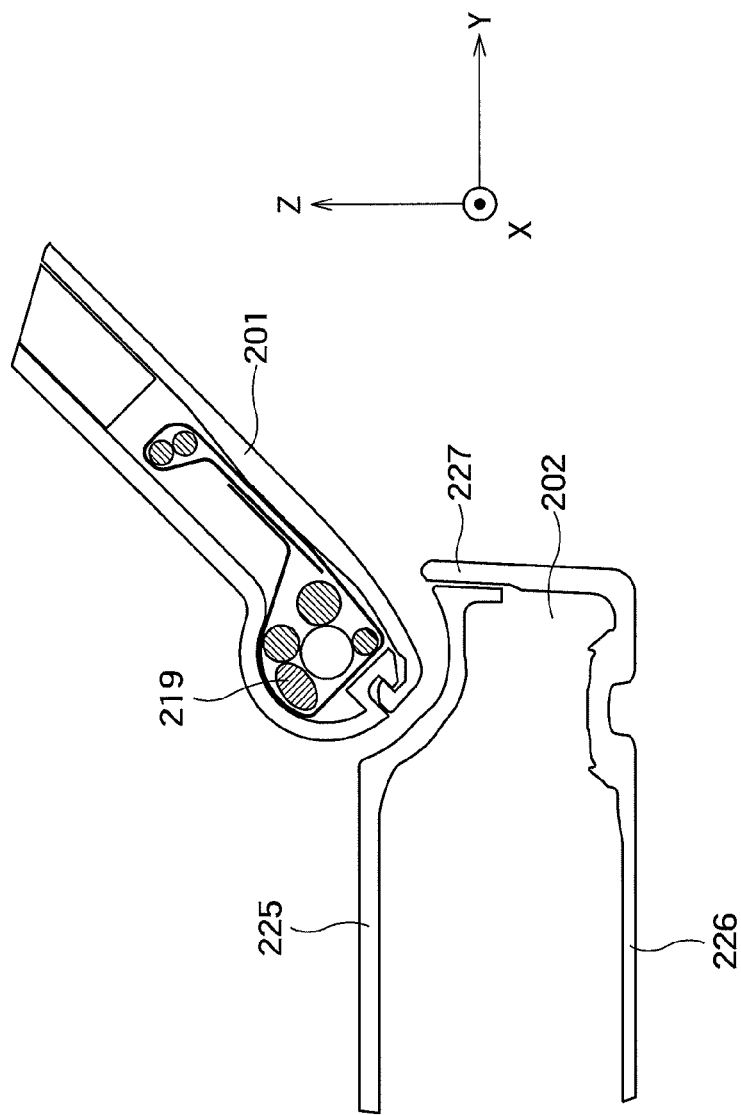
FIG. 9 is an enlarged sectional view of the connection unit of FIGS. 7A and 7B.

A connection unit 219 connects the first main body unit 201 and the second main body unit 202. FIGS. 7A to 9 illustrate the detailed connection unit 219. FIGS. 7A and 7B are perspective views illustrating a structure of the connection unit (a hinge unit, hinge mechanism, a coupling unit) 219. FIG. 7A illustrates a portion on the side of the fourth end portion 224 of the connection unit 219, and FIG. 7B illustrates a portion on the side of the third end portion 223 of the connection unit 219. FIGS. 8 and 9 are an enlarged perspective view and an enlarged sectional view of the connection unit 219 of FIGS. 7A and 7B, respectively. In this embodiment, the connection unit 219 connects the first main body unit (first housing unit) 201 and the second main body unit (second housing unit) 202.

As illustrated in FIG. 9, the second housing 213 includes a front surface (a first surface, a wall, an upper surface, an upper wall, a first casing, and a first component) 225, a back surface (a second surface, a wall, a lower surface, a bottom wall, a second casing, and a second component) 226, and a peripheral surface (a third surface, a peripheral wall, a sidewall, a wall, a surface, a domain, a side portion, and a vertical wall) 227. The keyboard 214 is exposed to the front surface 225. The back surface 226 is located on the opposite side of the front surface 225. The peripheral surface 227 connects the edge portion of the front surface 225 and the edge portion of the back surface 226. As illustrated in FIG. 9, the front surface 225 includes a dent portion in which the connection unit 219 intrudes.

The second housing 213 of this embodiment has a planar structure including the front surface 225, the back surface 226, and the peripheral surface 227. Alternatively, the second housing 213 may have a planar structure except that of this embodiment.

Figure 10:
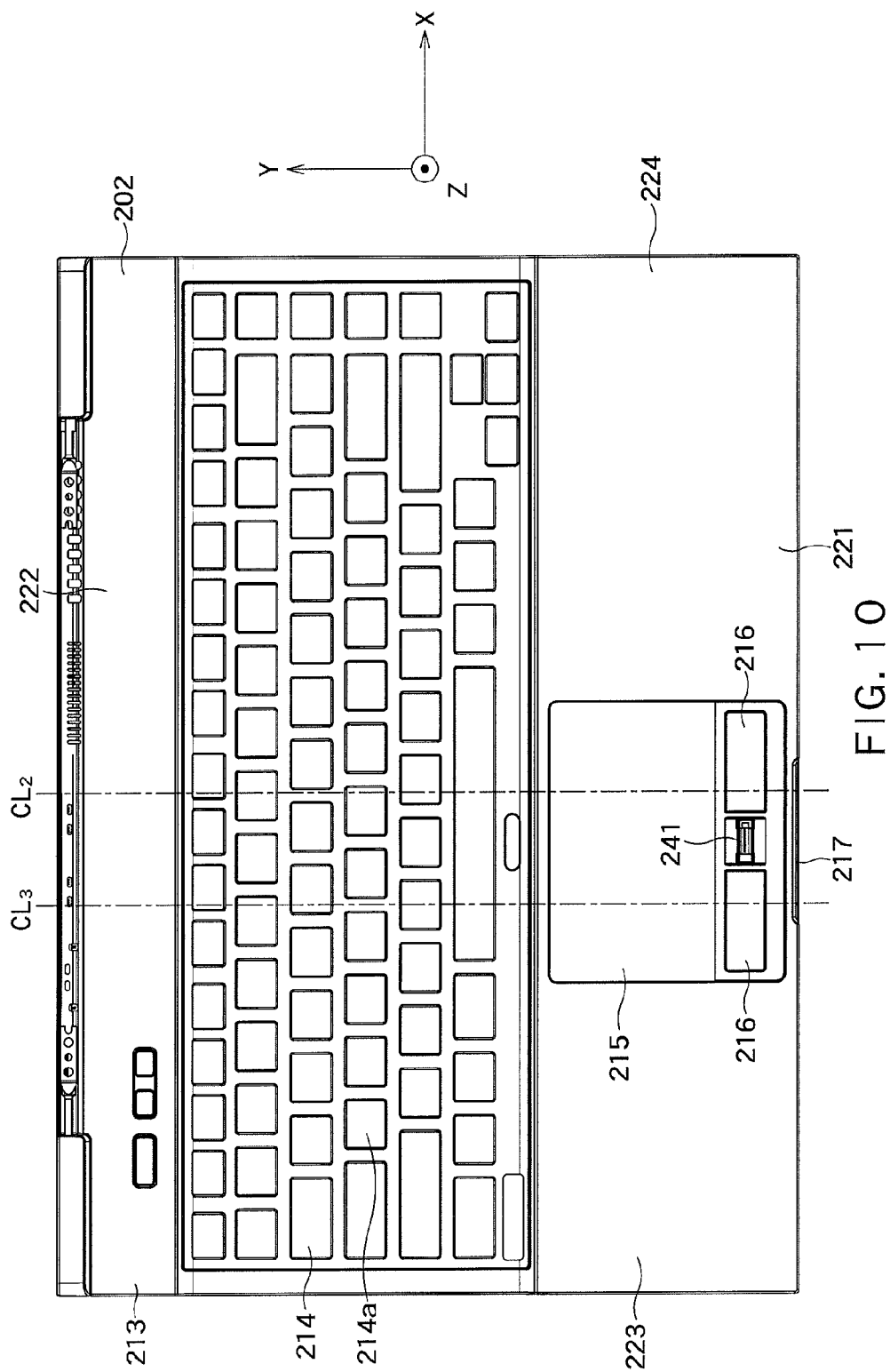
FIG. 10 is a front view illustrating an appearance of the second main body unit.

FIG. 10 is a front view illustrating an appearance of the second main body unit 202.

FIG. 10 illustrates a fingerprint authentication device 241 that is omitted in FIG. 4 for the sake of convenience. The fingerprint authentication device 241 is disposed in the front surface of the second housing 213, more particularly between the mouse pads 216 in the first end portion 221.

As described above, in this embodiment, the boundary line $CL_3$ of the home position is located closer to the side of the third end portion 223 than the center line $CL_2$. Therefore, the fingerprint authentication device 241 is disposed such that the gravity center of the fingerprint authentication device 241 is located closer to the side of the third end portion 223 than the center line $CL_2$.

(1) Details of Supporting Member 242

A supporting member 242 will be described in detail with reference to FIGS. 11 and 12.

Figure 11:
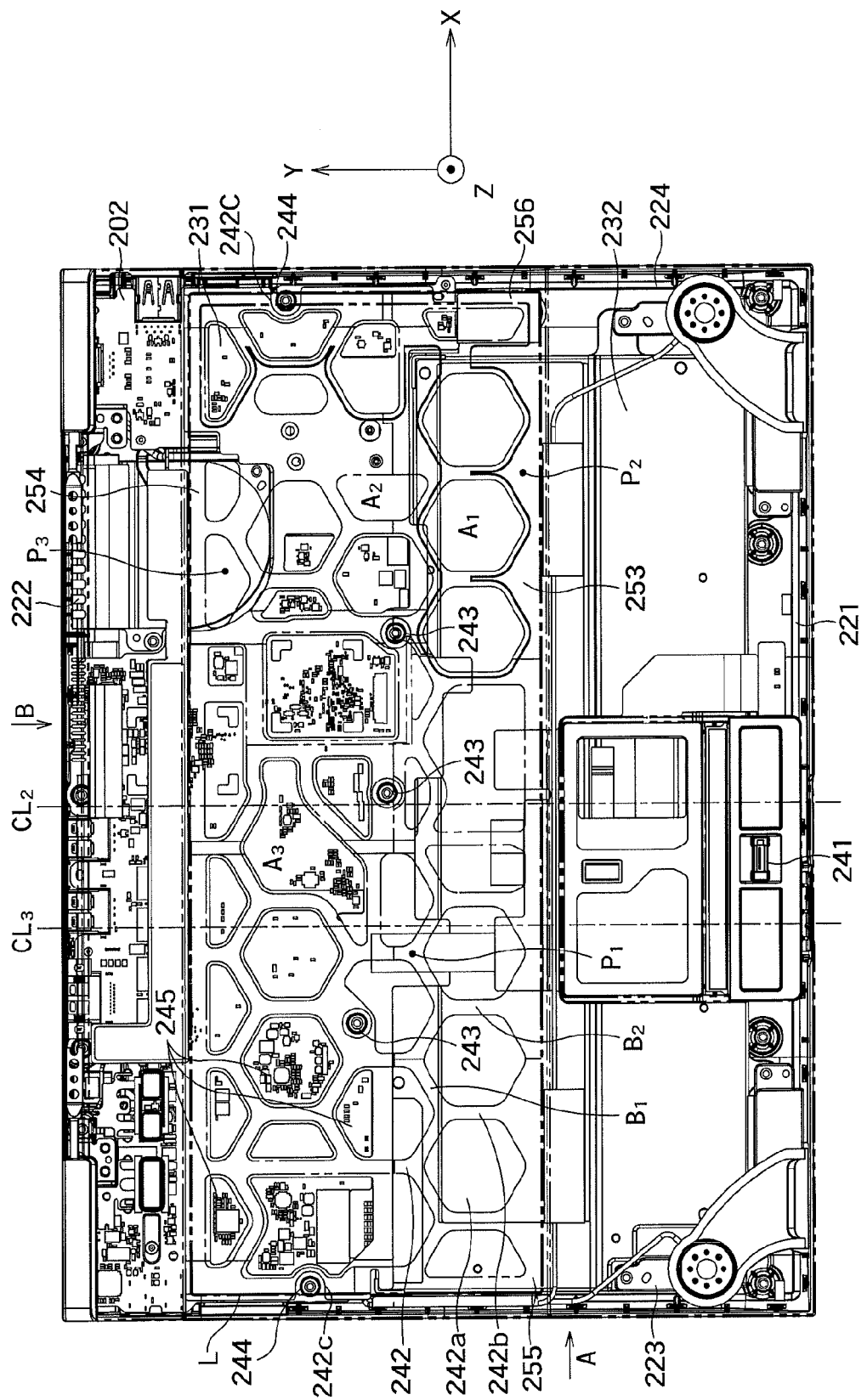
FIG. 11 is a front view illustrating an inner structure of the second main body unit.

As illustrated in FIG. 11, the second main body unit 202 includes the supporting member 242 that is accommodated in the second housing 213. The supporting member 242 is used to support various components in the second housing 213.

The supporting member 242 includes first to fourth end portions 253 to 256. The first end portion 253 is located on the side of the first end portion 221 of the second housing 213. The second end portion 254 is located on the opposite side of the first end portion 253, and extends in substantially parallel to the first end portion 253. The third end portion 255 connects the first end portion 253 and the second end portion 254, and extends in the direction substantially perpendicular to the first end portion 253. The fourth end portion 256 is located on the opposite side of the third end portion 255, and extends in substantially parallel to the third end portion 255. Similarly to the third end portion 255, the fourth end portion 256 connects the first end portion 253 and the second end portion 254.

The first and second end portions 253 and 254 extend in the lengthwise direction of the supporting member 242. On the other hand, the third and fourth end portions 255 and 256 extend in the crosswise direction of the supporting member 242, and are shorter than the first and second end portions 253 and 254.

If the first main body unit 201 is opened from the side closer to the user toward the side farther away from the user while the second main body unit 202 is placed on the horizontal surface, the first to fourth end portions 253 to 256 configure the lower end portion, the upper end portion, the left end portion, and the right end portion of the supporting member 242, respectively. In FIG. 11, the first and second end portions 253 and 254 are substantially parallel to the X-direction, and the third and fourth end portions 255 and 256 are substantially parallel to the Y-direction.

The supporting member (a support, a mounting unit, a supporting unit, a supporting surface, and a supporting wall) 242 of the embodiment includes the four end portions 253 to 256. Alternatively, the supporting member 242 may include the three end portions or less or at least the five end portions. The first end portion 253 and the second end portion 254 may extend while being not parallel to each other. Similarly the third end portion 255 and the fourth end portion 256 may extend while being not parallel to each other.

Figure 12A:
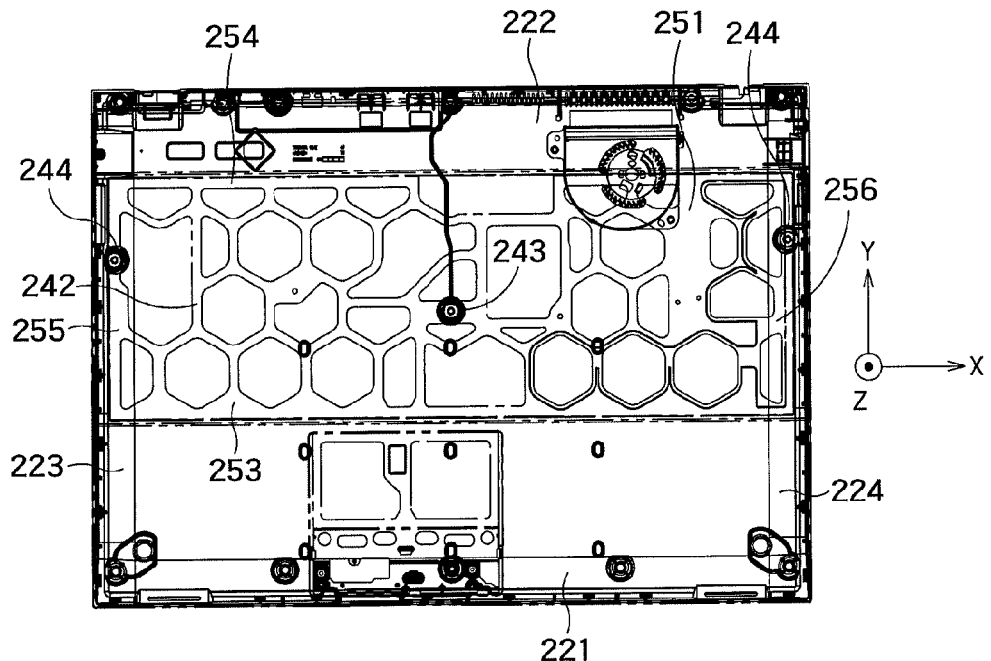
FIGS. 12A and 12B are front and rear views illustrating a shape and an arrangement of a supporting member.
Figure 12B:
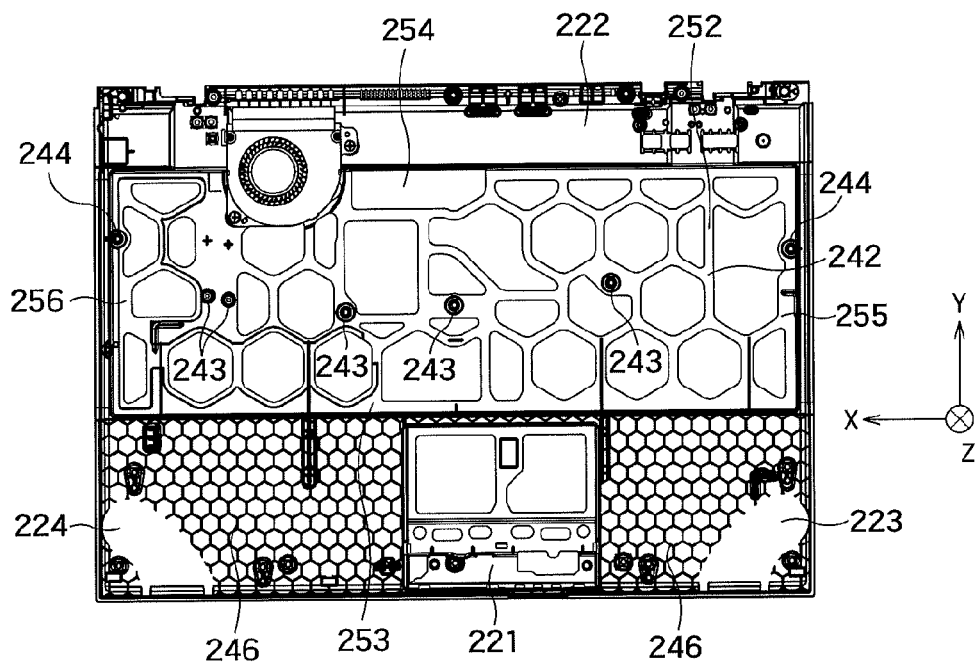

As illustrated in FIGS. 12A and 12B, the supporting member 242 includes a first supporting surface (a first surface, a domain, and a portion) 251 and a second supporting surface (a second surface, a domain, and a portion) 252. FIGS. 12A and 12B are a front view and a rear view illustrating a shape and placement of the supporting member 242, respectively. The first supporting surface 251 is oriented toward the side of the front surface 225 of the second housing 202. The second supporting surface 252 is oriented toward the side of the back surface 226 of the second housing 202, and located on the opposite side of the first supporting surface 251. In FIGS. 12A AND 12B, a rib (a protrusion unit, a supporting wall, a protrusion, and a vertical wall) 246 having the honeycomb structure is placed in a palm rest (a wall, a surface, and a domain on the opposite side of the hinge display with respect to the keyboard) of the second main body unit 202.

Returning to FIG. 11, the supporting member 242 will further be described.

The supporting member 242 includes plural openings 242a that penetrate from the first supporting surface 251 to the second supporting surface 252, a beam (a wall, a support surface, a supporting plate, a supporting domain, an intermediate unit, a pillar unit, and a bridge unit) 242b that is provided between the openings 242a, and a recess (an opening, a vertical wall, and a step unit) 242c that is provided in each of the first to fourth end portions 253 to 256. The weight of the supporting member 242 is reduced by making the openings 242a.

The supporting member 242 includes a hexagonal opening as the opening 242a. As a result, the supporting member 242 has the honeycomb beam structure. In FIG. 11, the beam (the wall, the support surface, the supporting plate, the supporting domain, the intermediate unit, the pillar unit, and the bridge unit) 242b of the supporting member 242 includes a first beam portion (a portion, a domain, an extending portion, and a covering portion) $B_1$ that is parallel to the third end portion 255 (that is, parallel to the Y-direction) and a second beam portion (a portion, a domain, an extending portion, and a covering portion) $B_2$ that is not parallel to the first or third end portion 253 or 255 (that is, not parallel to the X-direction or the Y-direction). These beam portions $B_1$ and $B_2$ configure the honeycomb beam structure.

In addition to a first opening $A_1$ having the hexagonal shape, the supporting member 242 includes a second opening $A_2$ having a shape in which the hexagon is cut by the straight line and a third opening $A_3$ having a shape that does not correspond to that of the first or second opening $A_1$ and $A_2$.

A positional relationship between the supporting member 242 and the main circuit board 231, the battery 232, and the keyboard 214 will be described below with reference to FIG. 11.

In the second housing 213, the main circuit board 231 is disposed on the side of the second supporting surface 252 of the supporting member 242. The main circuit board 231 is disposed in the position in which the main circuit board 231 partially overlaps with the supporting member 242 when viewed from the direction of the first supporting surface 251, namely, the Z-direction, and is supported by the supporting member 242. The main circuit board 231 and the supporting member 242 are fixed to the second housing 213 by screws (a fixture, a joining member, a component, a stopper, a supporting component, a member, and a screw) 243 and 244.

A screw 242 penetrates the supporting member 242. A screw 244 is inserted in the recess 242c of the supporting member 242. The main circuit board 231 and the supporting member 242 are securely fixed to the second housing 213 by the screws 243 and 243 attached to the central portion and the end portion of the supporting member 242.

In FIG. 11, the one first beam portion $B_1$ comes into contact with the two second beam portions $B_2$ at a contact point $P_1$. The strength of the beam 242b at the contact point $P_1$ is stronger than that of the beam 242b in other portions. In this embodiment, the screw 243 is attached in a position deviated from the contact point $P_1$. This is because the contact point $P_1$ is mainly utilized as a position in which each key $242a$ is placed in the embodiment.

Circuit components 245 are mounted on the main circuit board 231. In order to avoid the pressure from the supporting member 242, the circuit components 245 are mainly disposed in positions in which the circuit components 245 overlap with the openings $242a$ (positions in which the circuit components 245 do not overlap with the beam portion). For example, the third opening $A_3$ is used to accommodate the circuit components 245 that are not accommodated in the first and second openings $A_1$ and $A_2$.

In the second housing 213, the battery 232 is disposed on the side of the second supporting surface 252 of the supporting member 242. The battery 232 is disposed in the position in which the battery 232 partially overlaps with the supporting member 242 when viewed from the direction of the first supporting surface 251, namely, the Z-direction. The disposition of the battery 232 has the advantage that the pressure from the supporting member 242 can be transmitted to a bottom wall of the housing through the battery 232 during keying of the keyboard 242.

A fence-line L of FIG. 11 indicates an outline of the keyboard 214. In this embodiment, the outline L of the keyboard 214 is substantially matched with an outline of the supporting member 242. In the second housing 213, the keyboard 214 is disposed on the side of the first supporting surface 251 of the supporting member 242, and supported by the supporting member 242.

In this embodiment, the CPU 235 (see FIG. 6) on the main circuit board 231 is disposed in the position in which the CPU 235 overlaps with the outline of the keyboard 214 or the supporting member 242 when viewed from the Z-direction. More particularly, the CPU 235 is disposed in the position in which the CPU 235 overlaps with the second end portion 254 of the supporting member 242. The disposition of the CPU 235 has the advantage that the CPU 235 is placed far way from the keyboard 214 or the palm rest, which the user touch with the user's hand, to prevent heat of the CPU 235 from transferring to the user's hand. Additionally, there is also the advantage that the fan 218 can be disposed in the second end portion 222 of the second housing 213 that is distant from the user's hand.

The positional relationship between the supporting member 242, the main circuit board 231, the battery 232, and the keyboard 214 is described in detail later.

A method for preparing the supporting member 242 will be described below with reference to FIG. 11.

In this embodiment, for example, the supporting member 242 is prepared by metallic molding. At this point, in the embodiment, a molten metal flows in a direction indicated by an arrow B. This is attributed to the following fact. That is, because the third end portion 255 of the supporting member 242 is shorter than the first end portion 253, when the molten metal flows in the direction of the arrow B, a distance in which the molten metal flows becomes shorter compared with the case where the molten metal flows in the direction of an arrow A, so that a producing time can be shortened while a temperature decrease of the molten metal is suppressed.

In the embodiment, the first beam portion $B_1$ is designed to be not parallel to the first end portion 253, but the third end portion 255. This is because the molten metal flows easily when flowing in the direction of the arrow B. Therefore, according to the embodiment, the first beam portion $B_1$ is designed to be parallel to the third end portion 255, which facilitates the preparation of the supporting member 242 by the metallic molding.

(2) Effect of Supporting Member 242 of Second Embodiment

An effect of the supporting member 242 of the second embodiment will be described below with reference to FIG. 11.

The supporting member 242 of the embodiment has the honeycomb beam structure including the first beam portion $B_1$ that is parallel to the Y-direction and the second beam portion $B_2$ that is not parallel to the X-direction or the Y-direction. The honeycomb beam structure has the following advantages compared with the square type beam structure including the first beam portion $B_1$ that is parallel to the Y-direction and the second beam portion $B_2$ that is parallel to the X-direction.

First, in the supporting member 242 having the honeycomb beam structure, the torsional rigidity is increased compared with the same-weight supporting member 242 having the square type beam structure.

Second, in the supporting member 242 having the honeycomb beam structure, the rigidity against the pressure from the sides of the first and second end portions 253 and 254 and the pressure from the sides of the third and fourth end portions 255 and 256 is higher compared with the same-weight supporting member 242 having the square type beam structure.

Third, the weight of the supporting member 242 having the honeycomb beam structure can be reduced similarly to the supporting member 242 having the square type beam structure.

According to the embodiment, the use of the beam structure can enhance the rigidity of the supporting member 242 while reducing the weight of the supporting member 242. As a result, the weight reduction and the improvement of the rigidity can be achieved in the notebook PC.

Recently, the enlargement and the thinning have advanced rapidly in the notebook PC and more users carry and use the notebook PC. When the enlargement and the thinning further advance, it is expected that the user carries the PC while grasping the PC by one hand. In this case, possibly the PC is distorted in the case of being carried by one hand by the user if the rigidity of the PC is decreased.

On the other hand, according to the embodiment, the torsional rigidity of the supporting member 242 is increased, so that the problems accompanied with the weight-reduction, thin PC can be dealt with. According to the embodiment, the improvement of the rigidity can be achieved while the weight increase of the supporting member 242 is avoided.

(3) Disposition of Main Circuit Board 231, Battery 232, and Keyboard 214

The positional relationship between the supporting member 242 and the main circuit board 231, the battery 232, and the keyboard 214 will be described in detail with reference to FIGS. 13 to 17.

Figure 13:
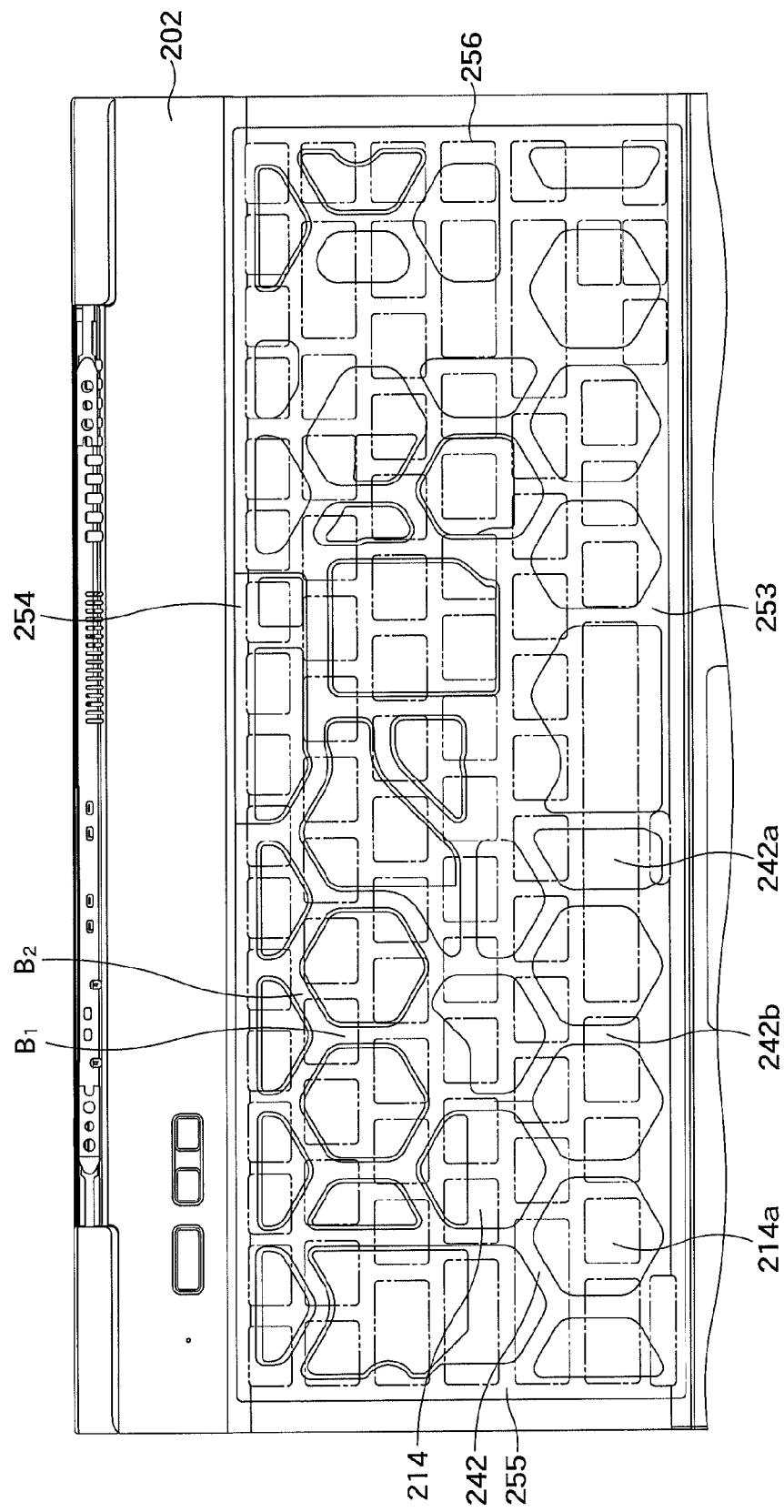
FIG. 13 is a front view illustrating the positional relationship between the supporting member and a keyboard.

FIG. 13 is a front view illustrating the positional relationship between the supporting member 242 and the keyboard 214.

In the embodiment, as illustrated in FIG. 13, a key $214a$ of the keyboard 214 is disposed in the position in which the key $214a$ substantially overlaps with the beam $242b$. The disposition of the key $214a$ has the advantage that the beam $242b$ can receive the pressure of the key $214a$ during the keying. The disposition of the key $214a$ can be achieved by adjusting the size and the position of the opening $242a$ during the designing.

In the embodiment, the keys $214a$ are disposed in the position in which the keys $214a$ overlap with the contact point $P_1$ of the first beam portion $B_1$ and the second beam portion $B_2$ as many as possible. This is because the strength of the beam 242b at the contact point $P_1$ is stronger than that of the beam 242b in other portions.

Figure 14:
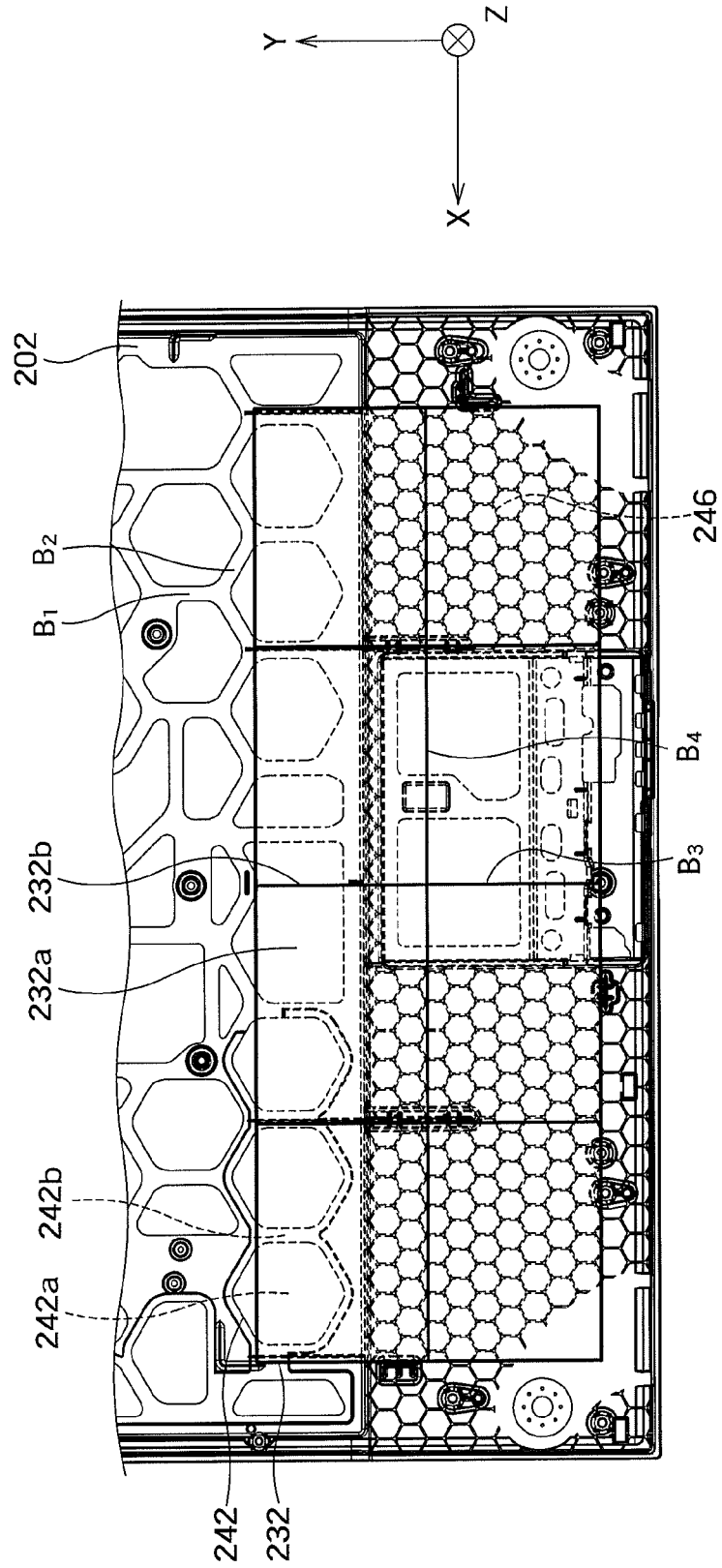
FIG. 14 is a rear view illustrating the positional relationship between the supporting member and a battery.

FIG. 14 is a rear view illustrating the positional relationship between the supporting member 242 and the battery 232. FIGS. 15A and 14B are sectional views illustrating a structure of the battery 232. FIG. 15A is a sectional view of the battery 232 along the Y-direction, and FIG. 15B is a sectional view of the battery 232 along the X-direction.

As illustrated in FIG. 14, the battery 232 includes plural cells 232a and a beam 232b that is provided between the cells 232a. The beam 232b of the battery 232 includes a third beam portion $B_3$ that is parallel to the first beam portion $B_1$ and a fourth beam portion $B_4$ that is not parallel to the first beam portion $B_1$. Specifically, the third beam portion $B_3$ is disposed in parallel to the Y-direction, and the fourth beam portion $B_4$ is disposed in parallel to the X-direction.

In the embodiment, some third beam portions $B_3$ are disposed in the positions in which the third beam portions $B_3$ overlap with the first beam portions $B_1$ when viewed from the direction of the first supporting surface 251, namely, the Z-direction. The dispositions of the third beam portions $B_3$ have the advantage that a load from the supporting member 242 can be prevented from being applied to the cell 232a.

As illustrated in FIG. 14, the battery 232 is disposed in the position in which the battery 232 overlaps with the rib 246 of the honeycomb structure, which is protruded toward the battery 232. The rib 246 also has the effect that the load applied to the battery 232 is reduced.

Figure 16:
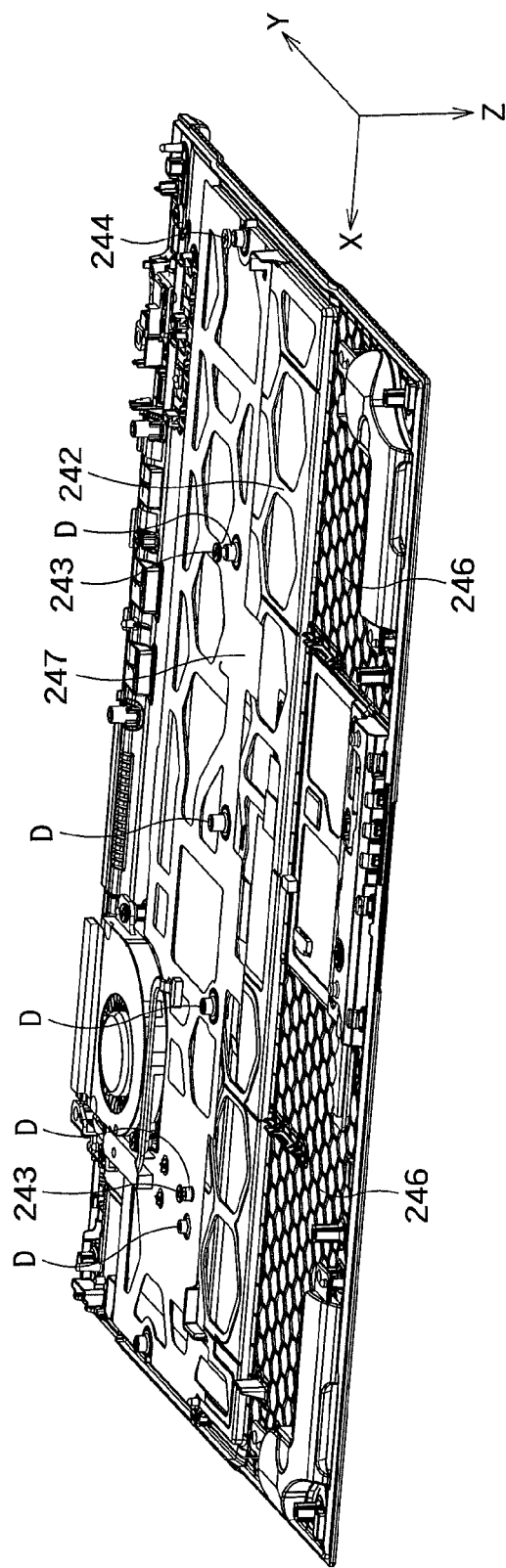
FIG. 16 is a rear view illustrating an inner structure of the second main body unit.

FIG. 16 is a rear view illustrating the inner structure of the second main body unit 202.

FIG. 16 illustrates the supporting member 242 and an insulating film (an insulator, an interposing unit, a sheet, and an intermediate member) 247 that is disposed on the side of the second supporting surface 252 of the supporting member 242. The insulating film 247 is disposed between the supporting member 242 and the main circuit board 231, and prevents direct contact and electrical connecting of the supporting member 242 and the main circuit board 231. The insulating film 247 may be replaced with an insulating member except the film.

As illustrated in FIG. 16, the supporting member 242 includes plural protrusion units D that are protruded onto the side of the second supporting surface 252. The protrusion unit D includes a hole (opening) in which the screw 243 is inserted. As illustrated in FIG. 16, the hole of the protrusion unit D has a substantially cylindrical shape.

Figure 17A:
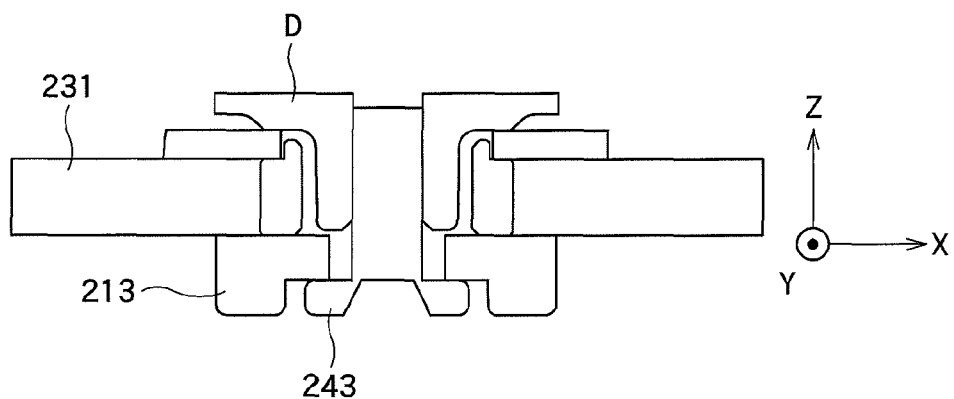
FIGS. 17A and 17B are sectional views for explaining a method for attaching a screw.
Figure 17B:
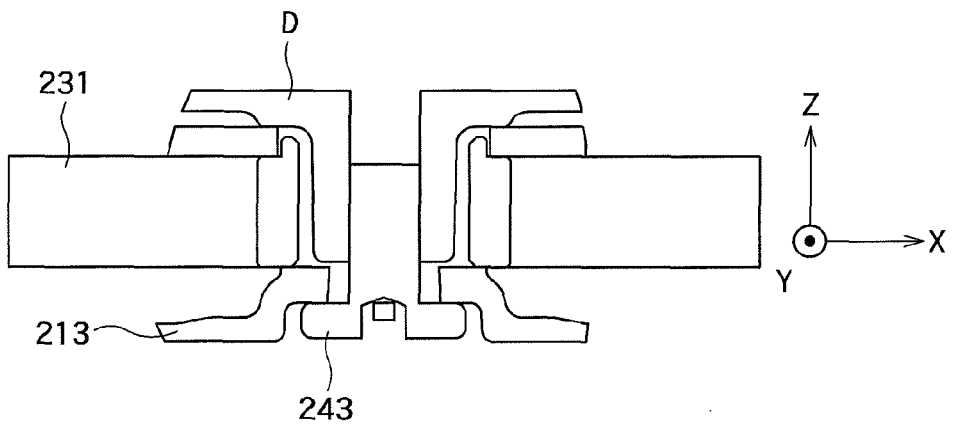

FIGS. 17A and 17B are sectional views for explaining a method for attaching the screw 243.

As illustrated in FIGS. 17A and 17B, the main circuit board 231 includes a hole (a through-hole and an opening) in which the screw 243 is inserted. At this point, the hole of the main circuit board 231 has a size larger than that of the protrusion unit D when viewed from above. Therefore, the protrusion unit D is inserted in the hole of the main circuit board 231.

A height of the protrusion unit D is set substantially equal to a thickness of the main circuit board 231. Therefore, as illustrated in FIGS. 17A and 17B, a leading end of the protrusion unit D is located near a board surface on the side of the second housing 213 of the main circuit board 231.

On the other hand, the second housing 213 includes a shallow dent (a recess and an opening) around the insertion hole of the screw 243, and a head unit (a protrusion unit, a hang-over unit, an umbrella unit, a supporting unit, and a retaining unit) is accommodated in the shallow dent. The screw 243 is inserted from the hole of the second housing 213 toward the hole of the protrusion unit D. Therefore, the supporting member 242 and the main circuit board 231 are fixed to the second housing 213. FIG. 5B illustrates an example of the screw 243.

According to the method for attaching the screw 243 of FIGS. 17A and 17B, the distance between the second housing 213 and the supporting member 242 can be decreased compared with a structure in which the second housing 213 and the supporting member 242 are tightened with the main circuit board 231 interposed therebetween. Specifically, the notebook PC can be thinned by the thickness of the main circuit board 231. Therefore, the method for attaching the screw 243 can promote the thinning of the notebook PC.

(4) Details of Opening 242a of Supporting Member 242

The opening 242a of the supporting member 242 will be described in detail with reference to FIGS. 18A and 19.

Figure 18A:
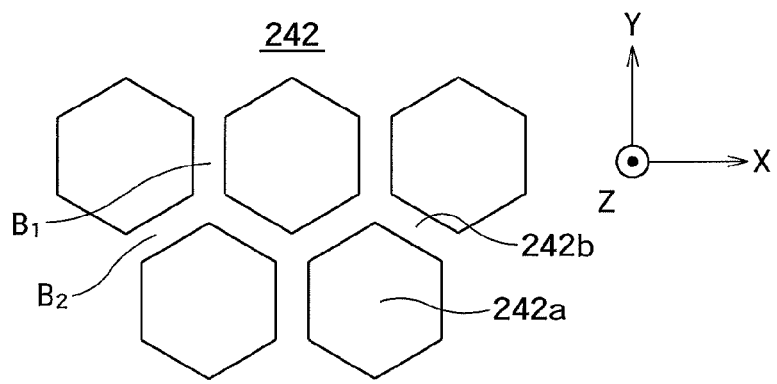
FIGS. 18A to 18C are front views for explaining the orientation of the beam configuring the supporting member.
Figure 18B:
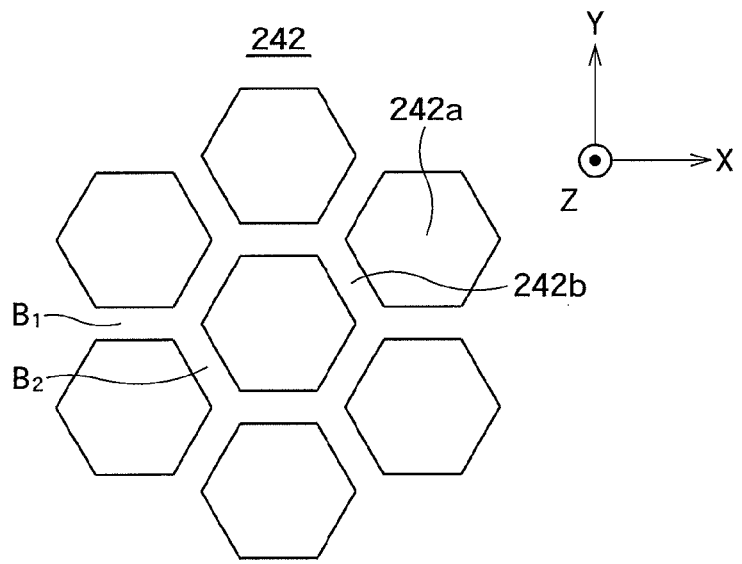
Figure 18C:
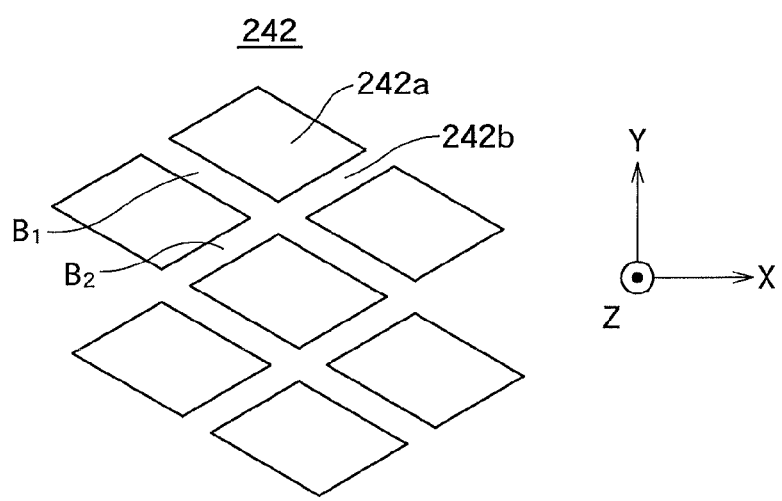

FIGS. 18A to 18C are front views for explaining the orientation of the beam 242b configuring the supporting member 242.

As illustrated in FIG. 18A, the supporting member 242 of the embodiment has the honeycomb beam structure including the first beam portion $B_1$ that is parallel to the Y-direction and the second beam portion $B_2$ that is not parallel to the X-direction or the Y-direction. Alternatively, the supporting member 242 may have a beam structure except the above honeycomb beam structure.

For example, as illustrated in FIG. 18B, the supporting member 242 may have a honeycomb beam structure including the first beam portion $B_1$ that is parallel to the X-direction and the second beam portion $B_2$ that is not parallel to the X-direction or Y-direction.

For example, as illustrated in FIG. 18C, the supporting member 242 may have a beam structure including the first and second beam portions $B_1$ and $B_2$ that are neither parallel nor perpendicular to each other. In FIG. 18C, the first and second beam portions $B_1$ and $B_2$ are provided so as to be not parallel to the X-direction or the Y-direction. The opening 242a has a parallelogram shape.

According to the beam structure of FIGS. 18B and 18C, a balance between the improvement of the strength and the weight reduction of the supporting member 242 can be established similarly to the beam structure of FIG. 18A. The opening 242a of the supporting member 242 may have a shape except the hexagonal shape. For example, the opening 242a may have a triangular, pentagonal, or octagonal shape. However, generally the beam structure of the hexagonal opening 242a has the advantage that the strength is higher than that of the same-weight beam structure of the opening 242a having another shape.

Figure 19:
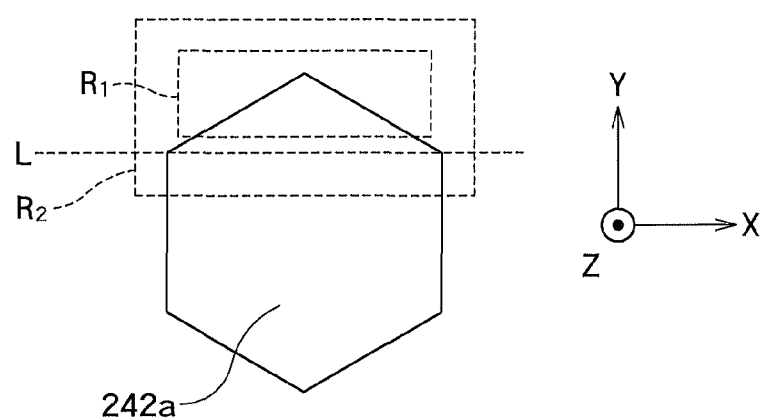
FIG. 19 is a front view for explaining an opening of the supporting member.

FIG. 19 is a front view for explaining the opening 242a of the supporting member 242.

The straight line L of FIG. 19 connects two adjacent apexes of the opening 242a having the hexagonal shape. The opening 242a is divided into a triangle and a hexagon by the straight line L.

A domain $R_1$ is smaller than the triangle of the opening 242a, and a domain $R_2$ is larger than the triangle of the opening 242a.

In the embodiment, the opening 242a having the domain $R_2$ is made in the supporting member 242 as illustrated by the contact point $P_3$ of FIG. 11, while the opening 242a having the domain $R_1$ is not made as illustrated by the contact point $P_2$ of FIG. 11. This is because the opening 242a having the domain $R_1$ has a little effect of the weight reduction of the supporting member 242.

In the embodiment, the cutting position of the straight line L is set to a threshold whether the opening 242a is made. Alternatively, another cutting position may be used as the threshold.

(5) Effect of Second Embodiment

Finally, an effect of the second embodiment will be described.

As described above, the supporting member 242 of the embodiment has the beam structure including the first and second beam portions $B_1$ and $B_2$ that are neither parallel nor perpendicular to each other. Therefore, according to the embodiment, similarly to the first embodiment, the rigidity of the supporting member 242 can be enhanced while the weight of the supporting member 242 is reduced by the beam structure.

This embodiment can also be applied to various electronic devices, except the notebook PC, such as the television receiver.

While certain embodiments have been described, these embodiments have been presented by way of example only, and are not intended to limit the scope of the inventions. Indeed, the novel receivers and devices described herein may be embodied in a variety of other forms; furthermore, various omissions, substitutions and changes in the form of the receivers and devices described herein may be made without departing from the spirit of the inventions. The accompanying claims and their equivalents are intended to cover such forms or modifications as would fall within the scope and spirit of the inventions.

The invention claimed is:

1. A electronic device comprising:
    a housing;
    a supporting member accommodated in the housing, including a first supporting surface, a second supporting surface located on an opposite side of the first supporting surface, a first end portion, a second end portion located on an opposite side of the first end portion, a third end portion connecting the first and second end portions, and a fourth end portion located on an opposite side of the third end portion, and including a plurality of openings penetrating from the first supporting surface to the second supporting surface;
    a first electronic component disposed on the first supporting surface of the supporting member;
    a second electronic component disposed on the second supporting surface of the supporting member; and
    a battery disposed on the first supporting surface side or the second supporting surface side in the housing, the battery being disposed in a position in which the battery partially overlaps with the supporting member when viewed from a direction of the first supporting surface,
    wherein
    the supporting member includes a beam provided between the openings,
    the beam includes a first beam portion which is parallel to the first or third end portion, and a second beam portion which is not parallel to the first and third end portions,
    the battery includes a plurality of cells, and a beam provided between the cells,
    the beam of the battery includes a third beam portion which is parallel to the first beam portion, and a fourth beam portion which is not parallel to the first beam portion, and
    the third beam portion is disposed in a position in which the third beam portion overlaps with the first beam portion when viewed from the direction of the first supporting surface.

2. The device of claim 1, wherein the openings of the supporting member comprises at least one opening having a hexagonal shape.

3. The device of claim 1, wherein the supporting member comprises:
    a first opening having a hexagonal shape;
    a second opening having a shape in which a hexagon is cut by a straight line; and
    a third opening having a shape which does not correspond to the first and second openings.

4. The device of claim 1, wherein the third end portion is shorter than the first end portion, and the first beam portion is parallel to the third end portion.

5. The device of claim 1, wherein the supporting member comprises a recess through which a screw is inserted, in one of the first to fourth end portions.

6. The device of claim 1, further comprising a circuit board disposed on the first supporting surface side or the second supporting surface side in the housing, and including a central processing unit,
    wherein the circuit board is disposed in a position in which the circuit board partially overlaps with the supporting member when viewed from a direction of the first supporting surface.

7. The device of claim 6, wherein the central processing unit is disposed in a position in which the central processing unit overlaps with one of the first to fourth end portions when viewed from the direction of the first supporting surface.

8. An electronic device comprising:
    a housing;
    a supporting member accommodated in the housing, including a first supporting surface, and a second supporting surface located on an opposite side of the first supporting surface, and including a plurality of openings penetrating from the first supporting surface to the second supporting surface; and
    a battery disposed on the first supporting surface side or the second supporting surface side in the housing, the battery being disposed in a position in which the battery partially overlaps with the supporting member when viewed from a direction of the first supporting surface,
    wherein
    the supporting member includes a beam provided between the openings,
    the beam includes first and second beam portions which are neither parallel nor perpendicular to each other,
    the battery includes a plurality of cells, and a beam provided between the cells,
    the beam of the battery includes a third beam portion which is parallel to the first beam portion, and a fourth beam portion which is not parallel to the first beam portion, and
    the third beam portion is disposed in a position in which the third beam portion overlaps with the first beam portion when viewed from the direction of the first supporting surface.

* * * * *